US010787574B2

(12) United States Patent
Hopkins et al.

(10) Patent No.: US 10,787,574 B2
(45) Date of Patent: Sep. 29, 2020

(54) POLYMER DERIVED CERAMIC EFFECTS PARTICLES, USES AND METHODS OF MAKING

(71) Applicant: Melior Innovations, Inc., Houston, TX (US)

(72) Inventors: Andrew R. Hopkins, Sylvania, OH (US); Mark S. Land, Houston, TX (US); Michael J. Mueller, Katy, TX (US); Michael Molnar, Summerfield, NC (US); Charles C. Rinzler, San Francisco, CA (US); Douglas Dukes, Troy, NY (US); Wen P. Liao, Clifton Park, NY (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 15/699,732

(22) Filed: Sep. 8, 2017

(65) Prior Publication Data

US 2018/0194945 A1    Jul. 12, 2018

Related U.S. Application Data

(63) Continuation-in-part of application No. 15/002,773, filed on Jan. 21, 2016, which is a continuation-in-part (Continued)

(51) Int. Cl.
*C09C 1/00* (2006.01)
*C08G 77/04* (2006.01)
*C04B 35/571* (2006.01)

(52) U.S. Cl.
CPC .......... *C09C 1/0021* (2013.01); *C04B 35/571* (2013.01); *C08G 77/04* (2013.01); *C01P 2002/02* (2013.01); *C01P 2004/20* (2013.01); *C01P 2004/61* (2013.01); *C01P 2004/80* (2013.01); *C01P 2004/84* (2013.01); *C04B 2235/483* (2013.01);
(Continued)

(58) Field of Classification Search
None
See application file for complete search history.

(56) References Cited

U.S. PATENT DOCUMENTS 4,292,087 A    9/1981  Bell
4,833,220 A    5/1989  Frey et al.
(Continued)

FOREIGN PATENT DOCUMENTS

CN    201110211590    12/2011
WO    WO 2009/133765    5/2009

OTHER PUBLICATIONS

Mar. 21, 2018, Chinese Patent Office, Translation of Office Action Appl No. 201500230118.6.
(Continued)

*Primary Examiner* — Colleen P Dunn
*Assistant Examiner* — Ross J Christie
(74) *Attorney, Agent, or Firm* — Glen P. Belvis; Belvis Law, LLC.

(57) ABSTRACT

A polysilocarb effect pigments, uncoated and coated, that exhibit among other things optical properties such as interference, shine, shimmer and sparkle. Pastes and coating including these polysilocarb effect pigments.

18 Claims, 16 Drawing Sheets

Related U.S. Application Data of application No. 14/634,814, filed on Feb. 28, 2015, now Pat. No. 10,167,366, application No. 15/699,732, which is a continuation-in-part of application No. 14/634,819, filed on Feb. 28, 2015, now abandoned, application No. 15/699,732, which is a continuation-in-part of application No. 14/864,125, filed on Sep. 24, 2015.

(60) Provisional application No. 62/385,821, filed on Sep. 9, 2016, provisional application No. 62/106,094, filed on Jan. 21, 2015, provisional application No. 61/946,598, filed on Feb. 28, 2014, provisional application No. 62/106,094, filed on Jan. 21, 2015, provisional application No. 62/055,397, filed on Sep. 25, 2014.

(52) U.S. Cl.
CPC .. *C04B 2235/5292* (2013.01); *C04B 2235/72* (2013.01); *C04B 2235/725* (2013.01); *C09C 2200/10* (2013.01); *C09C 2200/301* (2013.01); *C09C 2200/308* (2013.01)

(56) References Cited

U.S. PATENT DOCUMENTS

| | | | |
|---|---|---|---|
| 4,877,820 A | 10/1989 | Cowan | |
| 5,130,400 A | 7/1992 | Pachaly | |
| 5,225,283 A | 7/1993 | Leung et al. | |
| 5,356,471 A | 10/1994 | Reynders | |
| 5,378,502 A | 1/1995 | Willard | |
| 9,815,943 B2 | 11/2017 | Sherwood et al. | |
| 9,815,952 B2 | 11/2017 | Sherwood | |
| 10,167,366 B2 | 1/2019 | Hopkins | |
| 10,221,660 B2 | 3/2019 | Moeller et al. | |
| 2003/0137736 A1* | 7/2003 | Phillips | C09C 1/0015 359/577 |
| 2003/0137737 A1 | 7/2003 | Phillips | |
| 2004/0166308 A1 | 8/2004 | Raksha | |
| 2005/0154082 A1 | 7/2005 | DeLuca | |
| 2005/0176850 A1 | 8/2005 | Schmidt | |
| 2006/0022198 A1 | 2/2006 | Aramata et al. | |
| 2006/0225609 A1 | 10/2006 | Rueger | |
| 2007/0212487 A1 | 9/2007 | Anselmann | |
| 2011/0197782 A1 | 8/2011 | Wang | |
| 2011/0311767 A1 | 12/2011 | Elahee | |
| 2012/0261606 A1 | 10/2012 | Hollman | |
| 2015/0175750 A1* | 6/2015 | Hopkins | C08G 77/12 51/298 |
| 2015/0252166 A1* | 9/2015 | Dukes | A61Q 3/02 424/61 |
| 2015/0252170 A1* | 9/2015 | Diwanji | C08L 83/04 424/61 |
| 2015/0252171 A1* | 9/2015 | Molnar | C09D 105/00 106/31.69 |
| 2016/0176223 A1 | 6/2016 | Degott et al. | |
| 2017/0183514 A1 | 6/2017 | Benac et al. | |
| 2017/0190628 A1* | 7/2017 | Easter | C04B 35/806 |
| 2017/0253720 A1 | 9/2017 | Hopkins et al. | |
| 2017/0368668 A1 | 12/2017 | Dukes et al. | |
| 2018/0194945 A1 | 7/2018 | Hopkins et al. | |
| 2018/0201115 A1 | 7/2018 | Venturi | |

OTHER PUBLICATIONS

Nov. 30, 2017, EPO, Search Report Appl No. 15755897.4.
2006, Dhoke, Performance of black pigments incorporated in.
Dec. 14, 2017, PCT, Search Report Appl No. PCT/US17/50780.
Dec. 14, 2017, PCT, Opinion Appl No. PCT/US17/50780.
Jan. 22, 2018, PCT, Search Report & Opinion PCT/US17/50770.

* cited by examiner

US 10,787,574 B2

POLYMER DERIVED CERAMIC EFFECTS PARTICLES, USES AND METHODS OF MAKING

This application:

(i) claims under 35 U.S.C. § 119(e)(1) the benefit of U.S. provisional application Ser. No. 62/385,821, filed Sep. 9, 2016;

(ii) is a continuation-in-part of U.S. patent application Ser. No. 15/002,773, filed Jan. 21, 2016, which claims under 35 U.S.C. § 119(e)(1) the benefit of U.S. provisional application Ser. No. 62/106,094, filed Jan. 21, 2015;

(iii) is a continuation-in-part of U.S. patent application Ser. No. 14/634,814 filed Feb. 28, 2015, which claims under 35 U.S.C. § 119(e)(1) the benefit of U.S. provisional application Ser. No. 61/946,598, filed Feb. 28, 2014;

(v) is a continuation-in-part U.S. patent application Ser. No. 14/634,819 filed Feb. 28, 2015, which claims under 35 U.S.C. § 119(e)(1) the benefit of U.S. provisional application Ser. No. 62/106,094, filed Jan. 21, 2015; and, (vi) is a continuation-in-part of U.S. patent application Ser. No. 14/864,125 filed Sep. 14, 2015, which claims under 35 U.S.C. § 119(e)(1) the benefit of U.S. provisional application Ser. No. 62/055,397, filed Sep. 25, 2014;

the entire disclosures of each of which are incorporated herein by reference.

BACKGROUND OF THE INVENTION

Field of the Invention

The present inventions relate to: ceramic materials having color and optical properties, including blackness and black color; starting compositions for these ceramic materials, and methods of making these ceramic materials; and formulations, compositions, materials and devices that utilize or have these ceramic materials. In particular, embodiments of the present inventions include: ceramics having silicon, oxygen and carbon, and methods of making these ceramics; and devices, structures and apparatus that have or utilize these formulations, plastics, paints, inks, coatings and adhesives containing these ceramics.

The present inventions further relate to these materials, and in particular, these silicon, carbon and oxygen containing ceramic materials, which may be black or other colors, and that exhibit optical properties, in addition to absorption, and in particular, and preferably, exhibit optical properties, such as: refraction, reflection, transmission, wavelength specific absorption, polarization, and combinations and various of these and other optical properties, as well as, interference, amplification and cancellation.

Generally, the art classifies pigments into three typical pigment types: absorption pigments, metal effect pigments and pearlescent pigments. While these are general classifications, it should be understood that other classifications, and types may be used to describe pigments, and their optical properties in a coating. There also may be variations and combinations of these, and other types or classifications of pigments in a coating.

Absorption pigments, which are illustrated in the schematic of FIG. 1A, are for example watercolor paints. They absorb part of the light which hits them and scatter the rest, giving them their own body color. Thus, as shown in FIG. 1A, a coating 100 on a substrate 102 has absorption pigments 103, 104, 105, 106. As light rays 107, 108, 109, 110 strike the pigments 103, 104, 105, 106 a range of the lights wavelengths are absorbed by the pigment and the remaining wavelengths are scattered. Typically, absorption pigments exhibit two primary optical properties, wavelength specific absorption and scatter.

Generally, metal effect pigments, which are illustrated in the schematic of FIG. 1B, redirect, e.g., reflect, the vast majority of the light that strikes them, e.g., in a manner similar to a tiny mirror. Thus, as shown in FIG. 1B a coating 110 on a substrate 112 has metal effect pigments 103, 104, 105. As light rays 106, 107, 108 strike the pigments 103, 104, 105 they are reflected and, typically exit back out through the coating surface. In this manner, these metal effect pigments give the coating, and thus the substrate, a surface luster, twinkle, dazzle, etc. Typically, metal effects pigments exhibit one primary optical property, reflectance.

Pearlescent pigments, which are illustrated in the schematic of FIG. 1C, exhibit multiple and varied optical properties. In some embodiments, they can be view as a combination metal effects pigments and absorption pigments, in others they have more complex and varied optical properties. Thus, as shown in FIG. 1C, a coating 120 on a substrate 122 has pearlescent effects pigments 123, 124, 125, 126. Although not shown in the schematic of FIG. 1C, pearlescent effects pigments typically have multi-layer structures. Thus, as light rays 127, 128, 129 strike and enter the pearlescent effects pigment 123, 124, 125, 126, the rays are refracted, reflected and transmitted, resulting generally in a complex pattern of rays (including various polarizations and wavelengths, as well as interference, amplification and cancellation) exiting the coating. Thus, typically pearlescent effects pigments exhibit a complex combination of multiple optical properties, e.g., refraction, reflection, polarization, absorption and wave combining effects (e.g., interference, amplification and cancellation). This complex ray pattern gives the coating, and thus the substrate, the unique brilliance, poop, shimmer, etc., that make pearlescent effects pigments in certain applications highly desirable.

In general, in should be understood that FIGS. 1A, 1B and 1C are schematic illustrations, and simplifications. The various types of pigments generally will be at much higher loadings, e.g., larger numbers present, and may be evenly suspended through the coating, or maybe stratified, e.g., all near the surface of the coating, the surface of the substrate and other variations and combinations. Generally, metal oxides are coated on a pigment body to produce an effects pigment. Typically, a wide variety of effects can be achieved, from matte shimmer similar to that of pearl or mother of pearl to interference looks with significant shimmer in many colors, as well as other and additional features and effects.

As used herein, unless stated otherwise, the term "effects pigment" and similar such terms shall be given their broadest possible meaning, and would include pearlescent effects pigments, metal effects pigments, vacuum-metallized aluminum pigments, cornflake-type, plate-like, lamellar, non-leafing aluminum flakes, mica-based pigments, high-chromaticity effect pigments, lamellar effect pigments and. The term effects pigments would include commercially available pigments, and pigments providing the features and optical effects of these commercially available pigments such as, for example: BASF Black Olive™, Dynacolor® pigments, Firemist® pigments, Glacier™ Frost White, Graphitan® graphite black pigment, and Lumina® pigments. In general effects pigments can recreate visual effects that are described by those of skill in the art, for example, as: providing interference effects for all color spaces; the creation of effects shades and extreme effect shades; the creation of optical effects and extraordinary optical effects ranging from a fine-grained luster to a bold silvery-white sparkle; effects from a soft, satin luster to a sharp, metallic brilliance; hiding power; gloss; chroma; and, as well as combinations and variations of these and other optical features and properties.

As used herein, unless stated otherwise, the terms "color," "colors" "coloring" and similar such terms are be given their broadest possible meaning and would include, among other things, the appearance of the object or material, the color imparted to an object or material by an additive, methods of changing, modifying or affecting color, the reflected refracted and transmitted wavelength(s) of light detected or observed from an object or material, the reflected refracted and transmitted spectrum(s) of light detected or observed from an object or material, all colors, e.g. white, grey, black, red, violet, amber, almond, orange, aquamarine, tan, forest green, etc., primary colors, secondary colors, and all variations between, and the characteristic of light by which any two structure free fields of view of the same size and shape can be distinguish between.

As used herein, unless stated otherwise, the terms "black", "blackness", and similar such terms, are to be given there broadest possible meanings, and would include among other things, the appearance of an object, color, or material: that is substantially the darkest color owing to the absence, or essential absence of, or absorption, or essential abortion of light; where the reflected refracted and transmitted spectrum(s) of light detected or observed from an object or material has no, substantially no, and essentially no light in the visible wavelengths; the colors that are considered generally black in any color space characterization scheme, including the colors that are considered generally black in L a b color space, the colors that are considered generally black in the Hunter color space, the colors that are considered generally black in the CIE color space, and the colors that are considered generally black in the CIELAB color space; any color, or object or material, that matches or substantially matches any Pantone® color that is referred to as black, including PMS 433, Black 3, Black 4, Black 5, Black 6, Black 7, Black 2 2×, Black 3 2×, Black 4 2×, Black 5 2×, Black 6 2×, Black 7 2×, 412, 419, 426, and 423; values on a Tri-stimulus Colorimeter of X=from about 0.05 to about 3.0; Y=from about 0.05 to about 3.0, and Z=from about 0.05 to about 3.0; in non glossy formulations; a CIE L a b of L=less than about 40, less than about 20, less than about 10, less than about 1, and about zero, of "a"=of any value; of "b"=of any value; and a CIE L a b of L=less than 50 and b=less than 1.0; an L value less than 30, a "b" value less than 0.5 (including negative values) and an "a" value less than 2 (including negative values); having a jetness value of about 200 $M_y$ and greater, about 250 $M_y$ and greater, 300 $M_y$ and greater, and greater; having an L=40 or less and a My of greater than about 250; having an L=40 or less and a My of greater than about 300; having a dM value of 10; having a dM value of −15; and combinations and variations of these.

As used herein, unless stated otherwise, the term "gloss" is to be given its broadest possible meaning, and would include the appearance from specular reflection. Generally, the reflection at the specular angle is the greatest amount of light reflected for any specific angle. In general, glossy surfaces appear darker and more chromatic, while matte surfaces appear lighter and less chromatic.

As used herein, unless stated otherwise, the term "Jetness" is to be given its broadest possible meaning, and would include among other things, a Color independent blackness value as measured by $M_y$ (which may also be called the "blackness value"), or $M_c$, the color dependent blackness value, and $M_y$ and $M_c$ values obtained from following DIN 55979 (the entire disclosure of which is incorporated herein by reference).

As used herein, unless stated otherwise, the term "undertone," "hue" and similar such terms are to be given their broadest possible meaning, and would include among other things.

As used herein, unless stated otherwise, the terms "visual light," "visual light source," "visual spectrum" and similar such terms refers to light having a wavelength that is visible, e.g., perceptible, to the human eye, and includes light generally in the wave length of about 390 nm to about 770 nm.

As used herein, unless stated otherwise, the term "paint" is to be given its broadest possible meaning, and would include among other things, a liquid composition that after application as a thin layer to a substrate upon drying forms a thin film on that substrate, and includes all types of paints such as oil, acrylic, latex, enamels, varnish, water reducible, alkyds, epoxy, polyester-epoxy, acrylic-epoxy, polyamide-epoxy, urethane-modified alkyds, and acrylic-urethane.

As used herein, unless stated otherwise, the term "plastic" is to be given its broadest possible meaning, and would include among other things, synthetic or semi-synthetic organic polymeric materials that are capable of being molded or shaped, thermosetting, thermoforming, thermoplastic, orientable, biaxially orientable, polyolefins, polyamide, engineering plastics, textile adhesives coatings (TAC), plastic foams, styrenic alloys, acrylonitrile butadiene styrene (ABS), polyurethanes, polystyrenes, acrylics, polycarbonates (PC), epoxies, polyesters, nylon, polyethylene, high density polyethylene (HDPE), very low density polyethylene (VLDPE), low density polyethylene (LDPE), polypropylene (PP), polyvinyl chloride (PVC), polyethylene terephthalate (PET), polybutylene terephthalate (PBT), poly ether ethyl ketone (PEEK), polyether sulfone (PES), bis maleimide, and viscose (cellulose acetate).

As used herein, unless stated otherwise, the term "ink" is to be given its broadest possible meaning, and would include among other things, a colored liquid for marking or writing, toner (solid, powder, liquid, etc.) for printers and copiers, and colored solids that are used for marking materials, pigment ink, dye ink, tattoo ink, pastes, water-based, oil-based, rubber-based, and acrylic-based.

As used herein, unless stated otherwise, the term "nail polish" and similar such terms, are to be given its broadest term, and would include all types of materials, coatings and paints that can be applied to, or form a film, e.g., a thin film, on the surface of a nail, including natural human nails, synthetic "fake" nails, and animal nails.

As used herein, unless stated otherwise, the term "adhesive" is to be given its broadest possible meaning, and would include among other things, substances (e.g., liquids, solids, plastics, etc.) that are applied to the surface of materials to hold them together, a substance that when applied to a surface of a material imparts tack or stickiness to that surface, and includes all types of adhesives, such as naturally occurring, synthetic, glues, cements, paste, mucilage, rigid, semi-rigid, flexible, epoxy, urethane, methacrylate, instant adhesives, super glue, permanent, removable, and expanding.

As used herein, unless stated otherwise, the term "coating" is to be given its broadest possible meaning, and would include among other things, the act of applying a thin layer to a substrate, any material that is applied as a layer, film, or thin covering (partial or total) to a surface of a substrate, and includes inks, paints, and adhesives, powder coatings, foam coatings, liquid coatings, and includes the thin layer that is formed on the substrate.

As used herein, unless stated otherwise, the term "sparkle" is to be given its broadest possible meaning, and would include among other things, multi angle reflections simultaneously imparted from the surface facets.

As used herein, unless stated otherwise, room temperature is 25° C. And, standard temperature and pressure is 25° C. and 1 atmosphere.

Generally, the term "about" and the symbol "~" as used herein unless specified otherwise is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

Figure 1A:
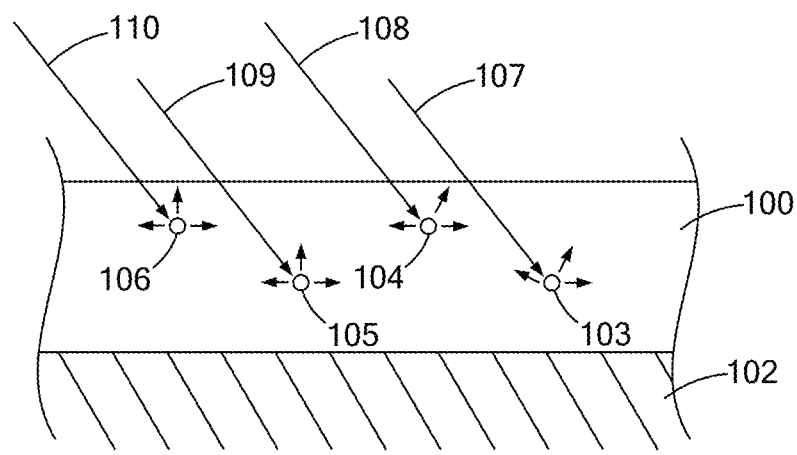
FIG. 1A is a schematic representation of the optical properties of a coating having absorption pigments.
Figure 1B:
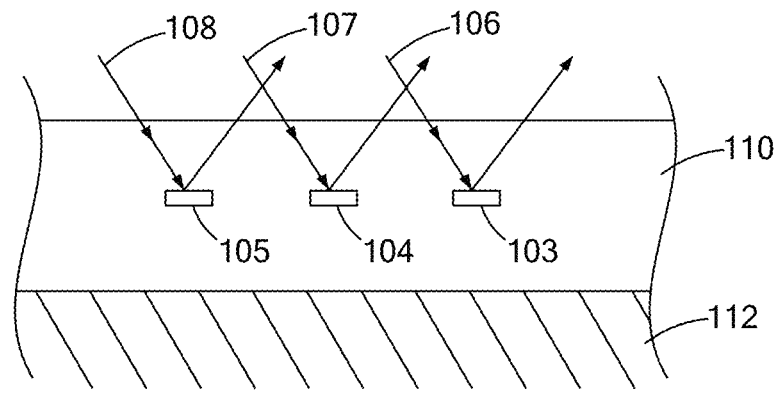
FIG. 1B is a schematic representation of the optical properties of a coating have metal effects pigments.
Figure 1C:
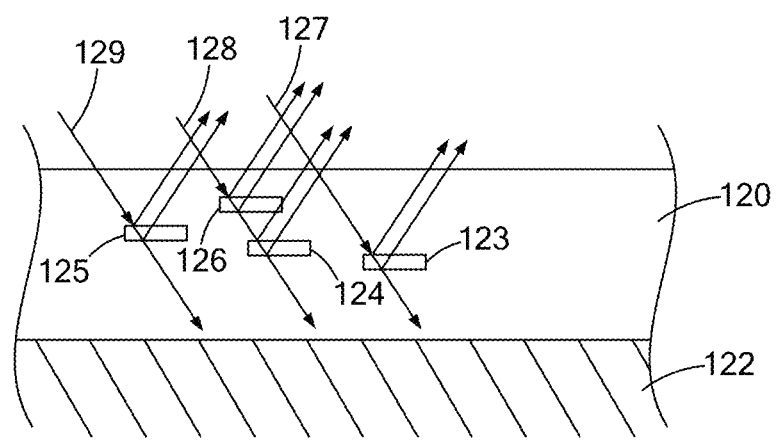
FIG. 1C is a schematic representation of the optical properties of a coating having pearlescent effects pigments.

There has been a long-standing and unfulfilled need for, improved pigments and additives for plastics, paints, inks, coatings and adhesives, as well as, a continued need for improved formulations for these coatings and materials. The present inventions, among other things, solve these needs by providing the compositions of matter, materials, articles of manufacture, devices and processes taught, disclosed and claimed herein.

There is provided a thin ceramic effect pigment flake having an amorphous ceramic polysilocarb; wherein the flake has a thickness of about 0.5 μm to about 1.5 μm.

Further there is provided these pastes, methods and flakes having one or more of the following features: whereby upon exposure to sunlight exhibits an optical effect selected from the group consisting of sparkle, metallic and pealessence; whereby upon exposure to sunlight exhibits an optical effect selected from the group consisting of shine and shimmer; whereby upon exposure to sunlight exhibits an optical effect selected from the group consisting of interference, amplification and cancellation; and having a metal oxide coating over the amorphous ceramic polysilocarb.

Still further there is provided a plurality of ceramic effect pigment thin flakes, having a polysilocarb based ceramic, the flakes having an average thickness of about 1.0-1.3 microns; and a particle size distribution of from about 1700-150 μm (80% or more) and <150 μm (20% or less).

Yet further there are provided these pastes, flakes and methods including one or more of the following features: whereby upon exposure to sunlight exhibit an optical effect selected from the group consisting of sparkle, metallic, pealessence, shine, shimmer, interference, amplification and cancellation; wherein the ceramic polysilocarb is amorphous; having a metal oxide coating over the ceramic polysilocarb.

Additionally, there are provided these pastes, flakes and methods having one or more of the following features: wherein the flake is planar; and wherein the flakes are corn flake shaped.

There is also provided a plurality of ceramic effect pigment thin flakes, having a polysilocarb based ceramic, the flakes having an average thickness of about 0.8-1.0 μm, and a particle size distribution of about D10≤6.00 μm, D50 11.0-14.50 μm, and D90 21.00-25.00 μm; and a sieve residue 45 μm less than 2.00.

There further provided a polysilocarb ceramic effect pigment thin flake with an average thickness of about 0.5-0.9 microns, and a particle size from about 5.0-9.0 μm.

Yet additionally there is provided a plurality of ceramic effect pigment thin flakes, having a polysilocarb based ceramic, the flakes having an average thickness of about 1.0 microns; and a particle size distribution is D10 10.0-20.0 μm, D50 25.0-35.00 μm, and D90 55.0-65.0 μm.

Still further there is provided a plurality of ceramic effect pigment thin flakes, the flakes having a polysilocarb based ceramic; the flakes having a metal oxide coating; the flakes upon exposure to white light exhibit an optical effect in addition to reflectance and absorbance.

Moreover there is provided these pastes, flakes and methods having one or more of the following features: wherein the flakes have an average thickness of about 1.0 μm and a particle size distribution is D10 9.0-13.0 μm, D50 20.0-25.00 μm, and D90 37.0-93.0 μm; wherein the flakes have an average thickness of about 2.0 μm and a particle size distribution is D10 10.0-14.0 μm, D50 20.0-25.00 μm, and D90 35.0-41.0 μm; and, wherein the flakes have an average thickness of about 1.0 μm and a particle size distribution is D10 10.0-14.0 μm, D50 20.0-25.00 μm, and D90 35.0-41.0 μm.

Furthermore there is provided a paste having polysilocarb ceramic effect pigment thin flakes; wherein the flakes have an average thickness of about 0.5. μm to about 2.0 μm; the paste having about 63.0-67.0% of the pigment effect flakes and about 33.0%-37.0 of a volatile content.

In addition there is provided pastes, flakes and methods having one or more of the following features: wherein the particle size distribution for the flakes is D10 2.0-6.0 μm, D50 11.0-17.00 μm, and D90 27.0-35.0 μm; wherein the paste has about 63%-67% of the flakes as a non-volatile component and about 33%-37% of a volatile component; and, wherein the flakes have an average thickness of about 0.5. μm to about 1.5 μm; and, wherein the particle size distribution for the flakes is D10 2.0-6.0 μm, D50 11.0-17.00 μm, and D90 27.0-35.0 μm.

Furthermore, there is provided a method of making an effects pigment, the method including: depositing a thin layer of liquid material consisting essentially of silicon, carbon and oxygen, on a surface, the layer having a thickness of 0.3 to 2.5 μm; curing the layer while on the surface to form a solid cured polysilocarb material having a thickness of 0.3 to 2.5 μm, wherein the curing occurs at a temperature between 75° C. and 200° C. and in less than 5 minutes; pyrolizing the solid cured polysilocarb material to form an amorphous ceramic material consisting essentially of silicon, carbon and oxygen and having a thickness of 0.3 to 2.5 μm; and, imparting an optical surface effect on the amorphous ceramic material, whereby upon exposure to sunlight the amorphous ceramic material exhibits an optical effect selected from the group consisting of sparkle, metallic, pealessence, shine, shimmer, interference, amplification and cancellation.

Still further there is provided these pastes, methods and flakes having one or more of the following features: wherein imparting the optical surface effect includes applying a metal oxide to the amorphous ceramic material; wherein imparting the optical surface effect includes treating the amorphous ceramic material with a material, the material selected from the group consisting of silanes, silane coupling agents, hexamethyldisilazane, 3-aminopropyltriethoxy silane, vinyl trimethoxy silane, y-glycidoxypropyltrimethoxy silane, and methacryloxypropyltrimethoxy silane; and, wherein the cured ceramic polysilocarb material is, formed, e.g., broken shaped, milled, cut, etc., into flakes having a particle size distribution is D10 10.0-14.0 μm, D50 20.0-25.00 μm, and D90 35.0-41.0 μm.

DESCRIPTION OF THE PREFERRED EMBODIMENTS

In general, embodiments of the present inventions relate to unique and novel polymer derived ceramic, and in particular, polysilocarb effect pigments, uncoated and coated, that exhibit among other things optical properties such as interference, shine, shimmer and sparkle, as well as pastes and coatings including these polysilocarb effect pigments. Embodiments of the present inventions further relate to unique and novel apparatus and methods for making these PDC effects pigments.

In general, embodiments of the present inventions relate to: ceramic materials having color and optical properties, including blackness and black color; starting compositions for these ceramic materials, and methods of making these ceramic materials; and formulations, compositions, materials and devices that utilize or have these ceramic materials. In particular, embodiments of the present inventions include: ceramics having silicon, oxygen and carbon, and methods of making these ceramics; and devices, structures and apparatus that have or utilize these formulations, plastics, paints, inks, coatings and adhesives containing these ceramics.

In particular, embodiments of the present inventions further relate to these materials, and in particular, these silicon, carbon and oxygen containing ceramic materials, which may be black or other colors, and that exhibit optical properties, in addition to absorption, and in particular, and preferably, exhibit optical properties, such as: sparkle, metallic effects, pealessence, shine, shimmer, refraction, reflection, transmission, wavelength specific absorption, polarization, and combinations and various of these and other optical properties, as well as, interference, amplification and cancellation, when subject to sun light or white light, e.g., light having the wavelengths across the range of the visible spectrum, as well as, broad spectrum light across and including light in the IR, visible and UV spectrum, such as is the case of sunlight.

Embodiments of the present effects pigments preferably use, are based upon or constitute PDCs that are "polysilocarb" materials, e.g., materials containing silicon (Si), oxygen (O) and carbon (C), and embodiments of such materials that have been cured, and embodiments of such materials that have been pyrolized. Typically, these pyrolized materials are amorphous. Polysilocarb materials may also contain other elements. Polysilocarb materials are made from one or more polysilocarb precursor formulation or precursor formulation. The polysilocarb precursor formulation contains one or more functionalized silicon polymers, or monomers, non-silicon based cross linkers, as well as, potentially other ingredients, such as for example, inhibitors, catalysts, fillers, dopants, modifiers, initiators, reinforcers, fibers, particles, colorants, pigments, dies, the same or other PDCs, ceramics, metals, metal complexes, and combinations and variations of these and other materials and additives. Silicon oxycarbide materials, SiOC compositions, and similar such terms, unless specifically stated otherwise, refer to polysilocarb materials, and would include liquid materials, solid uncured materials, cured materials, ceramic materials, and combinations and variations of these.

Examples of PDCs, PDC formulations, potential precursors, starting materials, and apparatus and methods for making these materials, that can be used, or adapted and improved upon employing the teachings of this specification to be used, in embodiments of the present inventions are found, for example, in US Patent Publication Nos. 2014/0274658, 2014/0323364, 2015/0175750, 2016/0207782, 2016/0280607, 2017/0050337, 2008/0095942, 2008/0093185, 2007/0292690, 2006/0069176, 2006/0004169, and 2005/0276961, and U.S. Pat. Nos. 9,499,677, 9,481,781, 8,742,008, 8,119,057, 7,714,092, 7,087,656, 5,153,295, and 4,657,991, and the entire disclosures of each of which are incorporated herein by reference.

Generally, in making effects pigments, e.g., flakes or platelets, the liquid polysilocarb precursor formulation is cured to form a solid or semi-sold material, e.g., cured material, green material, or plastic material. This material may be further cured, under predetermined conditions. The material may also be pyrolized under predetermined conditions to form a ceramic material. These processing conditions, and the particular formulations, can typically, contribute to the performance, features and properties of the end product or material. Typically, inhibitors and catalysis, as well as, or in addition to the selection of curing conditions, may be used to determine, contribute to, or otherwise affect, processing conditions, as well as, end properties of the material.

There are many different types of equipment and processes that can be used with PDC materials to form PDC platelets, disks, flakes, e.g., polysilocarb flakes for use as effects pigments.

Figure 6:
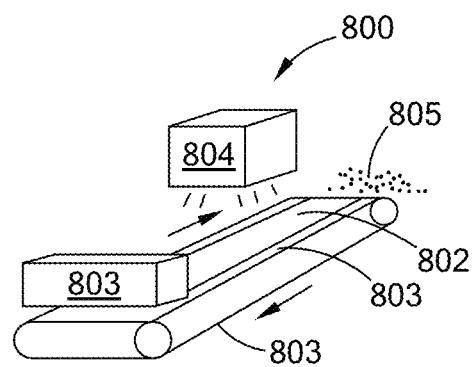
FIG. 6 is a schematic diagram of an embodiment of a forming table forming system and process in accordance with the present inventions.
Figure 7:
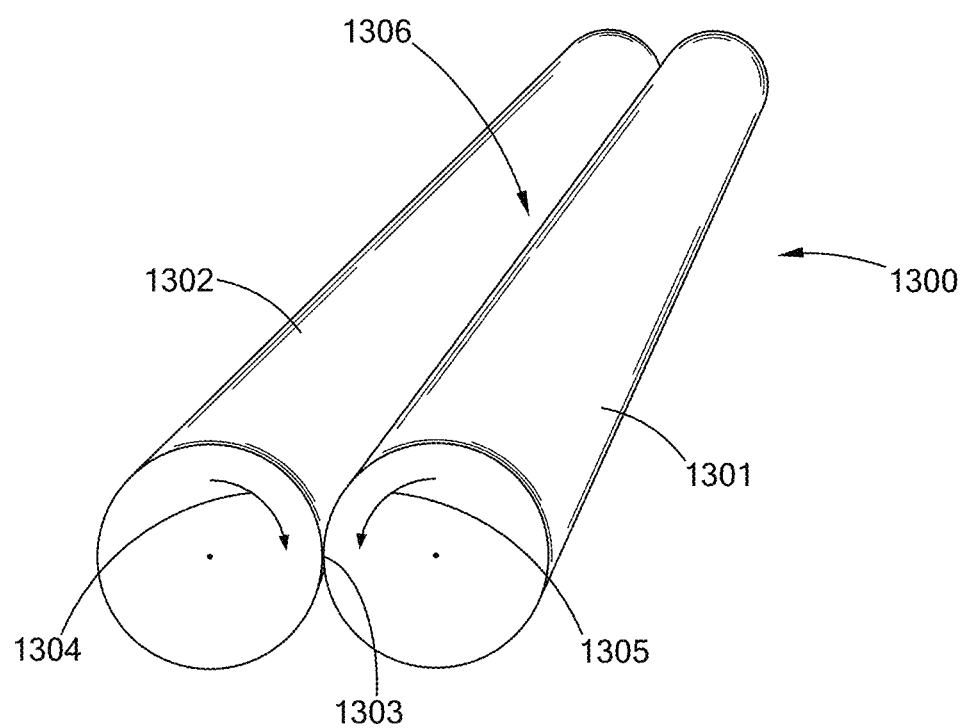
FIG. 7 is a perspective view of an embodiment of a nip type forming system and process in accordance with the present inventions.
Figure 7A:
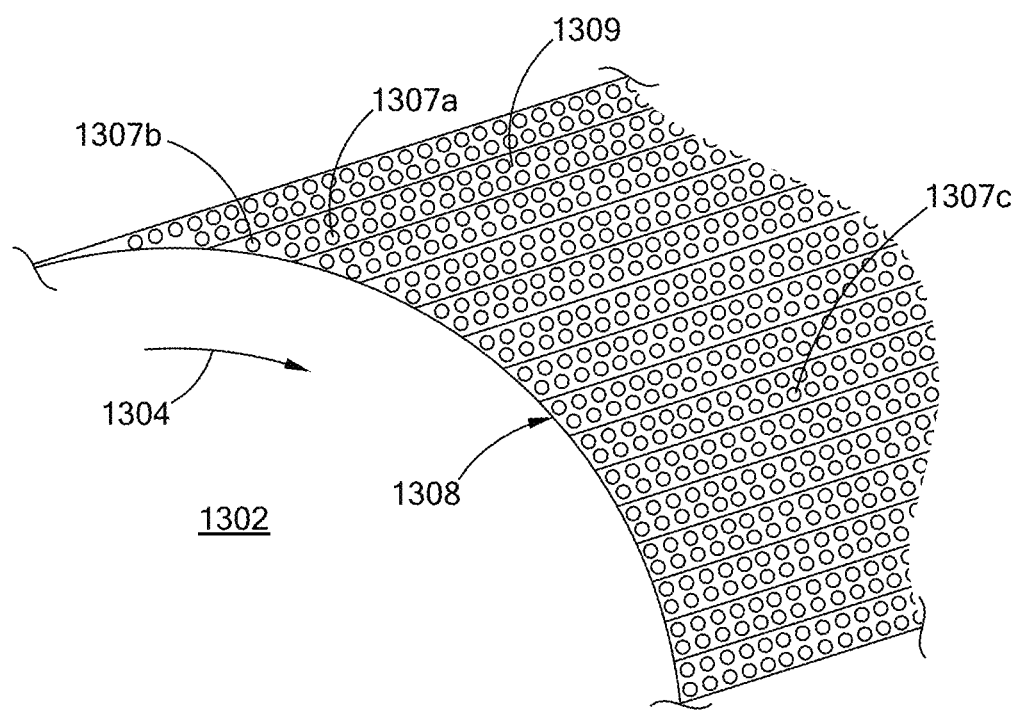
FIG. 7A is a perspective enlarged view of a section of a roller from the embodiment of FIG. 7.

Printing technologies, screen technologies, substrate technologies, nip technologies, as well as the other technologies for example as provided in FIGS. 6, and 7 and 7A, can be used to make small volumetric shaped structures from polymer derived ceramic precursors, to make small volumetric shaped preforms, and in particular to make such structures from polysilocarb precursor formulations.

Thus, for example the following technologies, equipment and methods can be used to form small volumetric preforms: printing technologies, such as rotogravure; 3-D printing; laser induced cavitation, e.g., US Patent Application Publication No. 2012/0236299 (the entire disclosure of which is incorporated herein by reference); nip based technologies; flexible substrate based technologies; spray chilling; and ionic gelation.

Turning to FIGS. 7 and 7A there is a perspective view of a nip forming assembly and system 1300, and a detailed perspective view of one of the rollers 1302. The nip forming system 1300 has a first roller 1301 and a second roller 1302, that are counter rotated as shown by arrows 1305, 1304. One or both of the roller surfaces has a surface, e.g., 1309 that has a series of forming cells, e.g., 1307a, 1307b, 1307c, e.g., small indentations, cups, vessels, receptacles. In operation as the two rollers 1301, 1302, are engaged and counter rotated a nip 1303 is formed. Precursor is feed into the top of the nip 1303, by a distribution assembly, as shown by arrow 1306. The nip 1303 forces the precursor into the forming cells, e.g., 1307a, 1307b, 1307c. The forming cell preferably cover the entirety of the roller surface 1309, and may be contained in an insert assembly or row 1308 having a collection of forming cells. In this way should cells become clogged or damage the row can be removed, cleaned, replaced and operation continued.

Within the rollers 1301, 1302 there are zones of higher and lower pressure so that the precursor can be held in the forming cells while cured and then ejected from the forming cells upon cure.

Substrate base forming technologies may be used to make small volumetric shapes. Generally, in these systems a base that can be ridged, flexible or continuous can be used. For example, a continuous screen (such as a metal, e.g., brass or, synthetic fourdriner wire, depending upon temperature, purity and other processing and end use requirements), a solid surface, or a flexible substrate can be used to hold or carry the precursor material, e.g., a thin layer or film of a liquid PDC precursor is spread or otherwise placed on the surface of the substrate. These substrates or bases can be moving, belt like, continuous or batch like, e.g. a tray. The precursor material can be cured, and hard cured in the openings in the wire, or on the surface of the substrate and then removed from the substrate. In the wire embodiment the cured material can be ejected from the wire. In the wire and other embodiments the cured material can be mechanically removed, ultrasonically removed, vibrated off, or otherwise separated from the substrate. Further, depending upon the type of curing, the cured material may spall, and thus, through spallation separate itself from the substrate.

For these approaches the substrate can be disposable, e.g., it does not need to be physically removed from the cured PDC material; instead it is consumed, and thus, removed during curing, and more preferably during pyrolysis. These systems provide a manner to make thin, and very thin sheets and platelets of PDC cured and pyrolized materials. Thus, the systems set forth in this specification can make sheets, flakes, and platelets that are thinner than 1 mm, thinner than 0.1 mm, thinner than 100 microns, thinner than 50 microns, thinner than 10 microns, thinner than 1 micron, and thinner than 0.1 microns, as well as thicker and thinner films, flakes, discs and platelets and other essentially planar volumetric shapes.

Examples of substrates would include polytetrafluoroethylene (PTFE), Acrylonitrile butadiene styrene (ABS), Nylon, PVC-type 1, polyethylene terephthalate (PET), polycarbonate, high density polyethylene (HDPE), ultrahigh molecular weight polyethylene (UHMW), polychloro trifluoroethylene (PCTFE), fluorinated ethylene propylene (FEP), perfluoro alkoxy (PFA), ethylene tetrafluoroethylene (ETFE), polyetherimide, polyether ether ketone (PEEK), acetal, acrylic, glass-epoxy laminate, phenolic paper, polyethylene terephthalate glycol (PETG), high impact polystyrene (HIPS), polyetherimide (PEI), polyvinylidene fluoride (PVDF), the forgoing and other plastics that are filled, blended or compounded with release agents, lubricants and similar materials, Delrin®, Teflon®, Nylatron®, Ertalyte® PET-P, Ertalyte® TX, Delrin® AF Blend—13% PTEE, Turcite® A (Blue), Kel-F® PCTFE, Fluorosint® HPV, Fluorosint® 207, Fluorsint® 500, Kynar® 740, Tefzel® ETFE, Ultem® 1000 Polyetherimide, AC 300™ ESd Acrylic sheet, Pomalloy ESd Acetal, G-11, G-10/FR-4, Phenolic Grade CE, Phenolic Grade LE, Phenolic Grade X Paper, Kydex 100® Sheet, Expanded PVC, Kormatex®, Makrofol® polycarbonate film, PEEK film crystalline, Kapton® polyimide film, Kaptrex® polyimide film, Kynar® PVDF film, flexible glass substrates, and other similar materials that are known to the art of release papers and surfaces or later developed.

The thin film or layer of a liquid PDC precursor can be formed on the substrate by any film forming apparatus, such as a distribution heeder, slice, air knife, rollers, sprayers, to name a few.

The thin film or layer of PDC precursor on the substrate can be cured with any of the heating and curing techniques and conditions describe herein. Further, because of the thin nature of the PDC precursor, in may be preferable to use electromagnetic radiation as source of energy to cure, pyrolize, or both, the thin film of PDC precursor. Thus, for example microwaves, coherent light, monochromatic light, broad spectrum light (e.g., high intensity white light) and other forms of elector magnetic radiation can be used. If white light is used, the white light can have a broad band of wavelengths, e.g., from near UV to near IR, from 390 nm to 790 nm, from about 400 nm to about 760 nm, having a wavelength band of at least about 100 nm, a wavelength band at least about 200 nm, a wavelength band at least about 300 nm, and combinations and variations of these. Light in the UV wavelengths (generally about 10 nm to 400 nm) can also be used, thus UV lamps, UV lasers, UV-LEDs or UV radiative sources can be used. To enhance UV curing a UV active catalysts (e.g., one that absorb best between 380 to 405 nm) can be added to the precursor. Wavelengths from 360-420 (UV to violet) can be used. The high intensity electromagnetic radiation, e.g., light can pulsed or continuous. The electro magnetic energy wavelength, or wavelengths, may also be selected to provide a predetermined amount of energy absorption by the PDC precursor. The PDC precursor may also have additives, such as colorants, that increase, or selectively determine, the amount of energy, e.g., electromagnetic energy, that is absorbed. Thus, the PDC precursor and the electromagnetic wavelength may be predetermined and matched to optimize curing, spallation and both, as well as other features of the end or intermediate PDC material. The substrate may also be transmissive to the electromagnetic radiation, and thus, the film of PDC precursor can be cured from both sides. Additionally, the substrate can be horizontal, vertical, or at an angle between horizontal and vertical when the PDC precursor material is applied. The substrate may also be circular, e.g., along the lines of a Yankee dryer paper making drum.

Turning to FIG. 6, there is shown an embodiment of a substrate forming apparatus and process 800. This system 800 has a forming unit 803 that provides a thin layer of PDC precursor 802 on a moving substrate 803 (e.g., a continuous belt in this embodiment). An energy source 804 (e.g., heat source, RF, light source, etc.) is provided to cure the PDC thin film 802, and cause the formation of platelets 805, when the PDC precursor is separated from the substrate.

Figure 8:
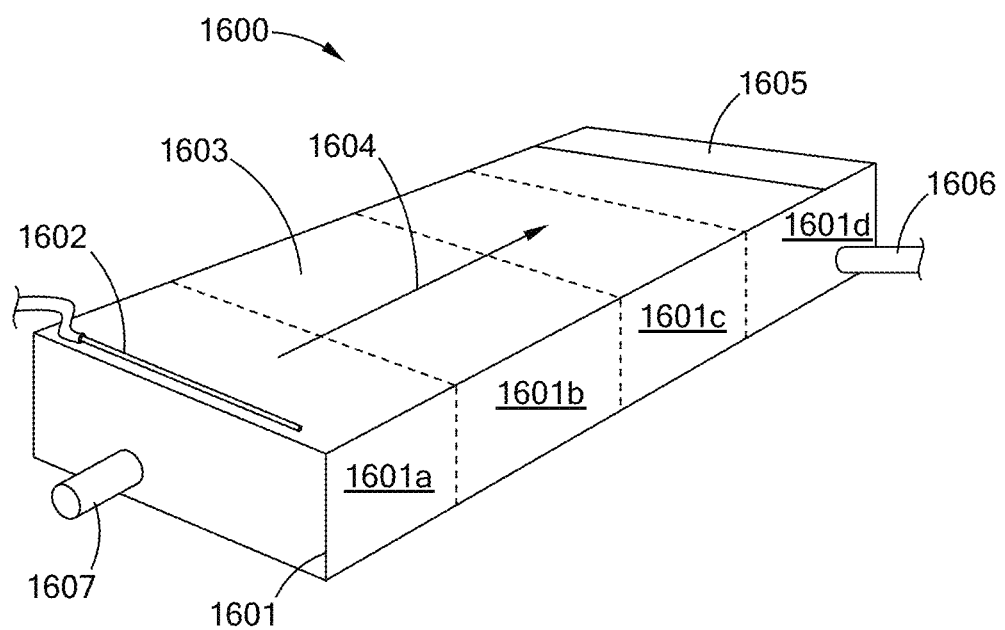
FIG. 8 is a perspective view of an embodiment of a solution forming system and process in accordance with the present inventions.

Turning to FIG. 8 there is shown a perspective view of an embodiment of a type of solution formation system and process. This embodiment, preferably, provides for continuous operation. The formation system 1600 has a vessel 1601, which in this case is a rectangular bath. The vessel 1601 has four zones 1601a, 1601b, 1601c, 1601d. The four zones can have the same conditions or different conditions. Thus, the four zones can have different temperatures, surfactant levels, degree of agitation, depth, temperature, flow rate and combinations and variations of these. For example, the first zone 1601a can be set up to have the best conditions for particle formation, and for a predetermined size of particle. The second zone 1601b can have the best conditions for initial curing. The third zone 1601c can have the best conditions to prevent agglomeration during final cure, and the fourth zone 1601d can be a removal or harvesting zone for the cured particles. The vessel 1601 contains a forming fluid 1603 that is flowing in the direction of arrow 1604. The fluid is agitated to a greater or lesser extent depending upon the zone, and the predetermined purpose or function of that zone, as well as other factors. The precursor is added to the forming fluid 1603 via distribution header 1602, which could be a screen, several screens, nozzles, slits, and combinations and variations of these and other devices to introduce precursors. The cured particles are removed from the system by particle removal device 1605, which could be a fine mesh collection system or a screen. A return line 1606 provides for the forming fluid to be returned and feed into the vessel by the inlet line 1607.

In this manner, the particles, are formed, at or near the distribution header 1602 and are carried by the flowing forming fluid 1603 in the direction of arrow 1604. The various zones of the system 1600 provide the requisite conditions for creating the cured particles.

If the cured material is to be pyrolized and transitioned into a ceramic, preferably the excess water is removed; and more preferably the material is dry before pyrolysis takes place. To the extent the cured material is stored, it should be stored at less than 150° C., at less than 140° C., and at less than 100° C., preferably it should also be stored in a reduce $O_2$ atmosphere. Additional curing may also take place after the cured particles are removed from the forming fluid and prior to pyrolysis. This final, or further curing and pyrolysis can take place together, e.g., serially in the same furnace, or can be separate procedures, e.g., different furnaces, storage time between procedures.

Embodiments of the methods can be practiced to produce spherical or non-spherical particles from precursors. For aqueous systems it is noted that the temperatures will generally be at, or below the boiling point for water, e.g., 100° C. (at standard temperature and pressure). For higher boiling temperature forming fluids, or increase pressures for aqueous fluids, higher temperatures can be used. In general, these systems can be used with any type precursor that is in liquid form, as long as the precursor does not react with the forming fluid at the processing temperatures, e.g., does not react water at or below 100° C. Typically, embodiments of aqueous systems using polysilocarb precursors can produce particles from about 5 mm diameter down to about 1 micron, although smaller and larger sizes are contemplated. The particles made by these embodiments can have different shapes and would include for example teardrop, spherical, dodecahedral, faceted, as well as other volumetric shapes.

Examples of polysilocarb precursor formulations that can be used in these systems, and in particular aqueous systems, are: 100% MHF; 95% MHF-5% TV; 46% MHF-34% TV-20% VT; 70% MHF-20% TV-10% VT; 75% MHF-15% TV-10% VT; 85/15 MHF/DCPD reaction blend; 70/30 MHF/DCPD reaction blend; and 65/35 MHF/DCPD reaction blend; 60/40 MHF/DCPD reaction blend; and 82/18 MHF/DCPD reaction blend. Additionally, to improve hardness of the cured beads, reduce cure time and both, 1% to 50% TV, 1% to 20% low molecular weight (MW<1000) VT can be added. Catalysis may include, for example 1-20 ppm platinum, dilute base, dilute acid, an amine catalyst, as well as other types of catalysts.

The precursor may be a silane modifier, such as vinyl phenyl methyl silane, diphenyl silane, diphenyl methyl silane, and phenyl methyl silane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenyl methyl silane, may function as an end capping agent, that may also improve toughness, alter refractive index, and improve high temperature cure stability of the cured material, as well as, improving the strength of the cured material, among other things.

In an embodiment of a process to make polymer derived ceramic pigment, and preferably to make a black polymer derived ceramic pigment, in the make-up segment a precursor formulation is metered into a one cubic meter tank having an in-line mix at rate of about 0.22 cubic meters per hour along with a stream of the catalyst at a ratio of 1 part catalyst to 100 parts precursor. The in-line mix tank is equipped with a high speed mixer. Residence time in the mix tank is about twenty-five minutes. The polymerization reaction starts in the mix tank.

In this embodiment of the process, the forming and curing segments are combined. Thus, the catalyzed precursor formulation, after mixing, is continuously feed to a drum, or a moving belt, e.g., a flaker belt, and preferably a stainless steel flaker belt or other similar device. Nozzles, a drip trough, an elongated opening, or slice, or other metering and distribution apparatus can be used to preferably obtain a uniform distribution, including thickness, of the liquid precursor on the moving belt. When the precursor is laid down onto the belt, the precursor can be moving at the same speed as the belt, at a faster speed than the belt (e.g., rushed), or at a slower speed than the belt (e.g., dragged). As the liquid precursor is moved with the belt it is heated to a sufficient temperature to cure the precursor formulation to form a cured material. For example, radiant heaters may be use above the belt, tunnel dryers may be used, the belt itself may be heated, e.g., with steam or electric heaters, and combinations and variations of these and other apparatus and methods to heat and maintain the temperature of the precursor material being carried on the belt. For example, in a preferred embodiment the belt is heated to about 100-200° C. by a steam coil along the underside of the belt. The cross linking reaction, which first began in the mixing tank, continues as the precursor travels along the belt to the point that it solidifies, preferably the precursor has reached a predetermined and predicted cure amount, e.g., green cure, hard cure, final cure, by the time it reaches the end of the belt. Depending upon the precursor formulation, the amount of catalyst, the temperature and other factors, the residence time on the belt can be about 5 to about 60 minutes, more than about 10 minutes, more than about 20 minutes, about 20 minutes, and more than about 40 minutes, and greater and lesser durations.

In this embodiment, at the end of the belt, the cured precursor, e.g., green material, falls from the belt and into a chopper, which reduces the size of the green material to about ≤10 μm, about ≤100 μm, about ≤200 μm, and about ≤500 μm, as well as other sizes. The chopped cured material can be stored, in for example a storage hopper.

In this embodiment of the process, in the pyrolizing segment the polymer from the storage hopper is transferred to cars and fed to a furnace, e.g., a kiln, periodic (e.g., box) kiln, and preferably an oxygen deficient, natural gas fired tunnel kiln.

The kiln is operated in an oxygen deficient regime to maintain a non-oxidizing atmosphere in the polymer. The cars move through the kiln, preferably at a constant rate, which results in a three phase, 24-hour pyrolysis process, e.g., a reforming process. In the first phase, the temperature of the polymer is raised to 1000° C. over a period of 16 hours. At the end of the 16-hour ramp period, it remains at this temperature, 1000° C., for two hours. In the final phase the material is air cooled to ambient temperature over the next six hours. Through this pyrolizing segment of the process the cured material, e.g., green material, is converted to a ceramic material. The ceramic material is removed, e.g., dumped from the kiln cars into an intermediate storage hopper awaiting further processing.

In this embodiment of the processes, throughout the pyrolizing segment, the exhaust gases from the kiln are preferably ducted away to a cleaning or waste handling system, for example to a Vapor Destruction Unit (VDU) to destroy residual combustibles. The VDU can than be followed by other cleaning systems, such as for example, a wet scrubber to remove any particulates (predominately silica). The silica can then be removed from the water effluent and recovered for reuse, sale or proper disposal. After removal of the silica, the effluent from the scrubber can be reused for example in a grey water loop, further cleaned and reused, or transferred to a waste water treatment facility for eventual discard.

The ability to start with a liquid material, e.g., the precursor batch, having essentially all of the building blocks, e.g., Si, O and C, needed to make SiOC pigments, additives, effects pigments, e.g., flakes, platelets, etc., provides a significant advantage in controlling impurities, contamination, and in making high purity SiOC pigments, additives, effects pigments, e.g., flakes and platelets as well as other volumetric shapes. U.S. patent application Ser. No. 14/864,125 disclosures and teaches formulations, methods, processes and apparatus to obtain high purity and ultra-high purity SiOC materials, the entire disclosure of which is incorporated herein by reference. Thus, embodiments of the present inventions provide for the formation of SiOC ceramic material that is at least about 99.9% (3-nines), at least about 99.99% (4-nines), at least about 99.999% (5-nines), and least about 99.9999% (6-nines) and at least about 99.99999% (7-nines) or greater purity. These purity values are based upon the amount of SiOC, verse all materials that are present or contained within a given sample of SiOC product.

As set forth in Table 2, embodiments of high purity polymer derived SiOC pigments, additives, and effects pigments, e.g., flakes, platelets, etc., can preferably have low levels of one, more than one, and all elements in Table 3, which in certain applications and uses are considered to be impurities, or otherwise undesirable. Thus, embodiments of polysilocarb derived SiOC products and materials, can be free of impurities, substantially free of impurities, and contain some but have no more than the amounts, and combinations of amounts, set out in Table 2.

TABLE 2

| Element | less than ppm | less than ppm | less than ppm | less than ppm | less than ppm |
| --- | --- | --- | --- | --- | --- |
| Al | 1,000 | 100 | 10 | 1 | 0.1 |
| Fe | 1,000 | 100 | 10 | 1 | 0.1 |
| B | 1,000 | 100 | 10 | 1 | 0.1 |
| P | 1,000 | 100 | 10 | 1 | 0.1 |
| Pt | 1,000 | 100 | 10 | 1 | 0.1 |
| Ca | 1,000 | 100 | 10 | 1 | 0.1 |
| Mg | 1,000 | 100 | 10 | 1 | 0.1 |
| Li | 1,000 | 100 | 10 | 1 | 0.1 |
| Na | 1,000 | 100 | 10 | 1 | 0.1 |
| Ni | 1,000 | 100 | 10 | 1 | 0.1 |
| V | 1,000 | 100 | 10 | 1 | 0.1 |
| Ti | 1,000 | 100 | 10 | 1 | 0.1 |
| Ce | 1,000 | 100 | 10 | 1 | 0.1 |
| Cr | 1,000 | 100 | 10 | 1 | 0.1 |
| S | 1,000 | 100 | 10 | 1 | 0.1 |
| As | 1,000 | 100 | 10 | 1 | 0.1 |
| Total of one or more of the above | 3,000 | 500 | 50 | 10 | 1 |

In an embodiment, Pr may also be considered an impurity in some applications and if so consider the limits and amounts of table 3 may be applicable to Pr.

In applications where nitrogen is viewed as a contaminate, embodiments of polysilocarb derived SiOC can have less than about 1000 ppm, less than about 100 ppm, less than about 10 ppm, less than about 1 ppm and less than about 0.1 ppm nitrogen, and lower.

Polymer derived ceramic effects pigments, for example embodiments of polysilocarb flakes, can withstand high pH (up to at least about pH of 10) and low pH (down to at least about pH of 3) ranges at room temperatures, as well as for some embodiments at elevated temperatures in the less than about 150° C. range. At temperatures below 20° C. and up to about 350° C. the polysilocarb effect flakes can withstand pH in the range of about 5.5-8.5 pH.

Polymer derived ceramic effects pigments, for example embodiments of polysilocarb flakes, can be high and very high, and ultra high purity. Embodiments of polysilocarb effects flakes can have purity levels up to about 7-nines pure. The process by which they are made also provides the ability to avoid or element certain and particular impurities on an application-by-application basis. Thus, provided custom embodiments eliminating specific impurities that are of particular concern in a particular application. U.S. patent application Ser. No. 14/864,125 disclosures and teaches formulations, methods, processes and apparatus to obtain high purity and ultra-high purity SiOC materials, the entire disclosure of which is incorporated herein by reference.

Polymer derived ceramic effects pigments, for example embodiments of polysilocarb flakes, can have index of refraction of about 2.647 for a black flake particle. Other embodiments of black SiOC effects flakes can have an index of refraction of about 1.6 to about 2.8.

Polymer derived ceramic effects pigments, for example embodiments of polysilocarb flakes, have an actual density of about 2.0 to about 2.1 g/cc. The bulk density of embodiments of these flakes can be very low, and will vary upon size, uniformity, and other factors. Embodiments can have bulk densities of from about 0.15 g/cc to about 0.2 g/cc.

Polymer derived ceramic effects pigments, for example embodiments of polysilocarb flakes, can maintain their optical properties and color up to about 350° C., and in embodiments up to and in excess of 450° C. Embodiments can maintain their physical structure, e.g., not soften, not melt and not burn, to temperatures in excess of 650° C., as they are ceramics.

In an embodiment, polysilocarb effects pigments, coatings, coating formulations and materials have one or more of the following features: wherein the polymer derived ceramic pigment has a primary particle $D_{50}$ size of from about 0.1 μm to about 2.0 μm; wherein the polymer derived ceramic pigment is loaded at from about 1.5 pounds/gallon to about 10 pounds/gallon; wherein the resin is selected from the group of resins consisting of thermoplastic acrylic polyols, Bisphenol A diglycidal ether, silicone, oil based, and water-reducible acrylic; wherein the formulation has less than about 0.01 ppm of heavy metals; wherein the formulation has less than about 0.1 ppm of heavy metals; wherein the formulation has less than about 1 ppm of heavy metals, and the paint formulation is a very high temperature coating, wherein the paint formulation is thermally stable to greater than 700° C.; wherein the formulation has less than about 10 ppm of heavy metals, and the paint formulation is a very high temperature coating; wherein the paint formulation is a very high temperature coating, and wherein the paint formulation is thermally stable to greater than 1000° C.; wherein the first material has a system selected from the group of systems consisting of acrylics, lacquers, alkyds, latex, polyurethane, phenolics, epoxies and waterborne; wherein the first material has a material selected from the group consisting of HDPE, LDPE, PP, Acrylic, Epoxy, Linseed Oil, PU, PUR, EPDM, SBR, PVC, water based acrylic emulsions, ABS, SAN, SEBS, SBS, PVDF, PVDC, PMMA, PES, PET, NBR, PTFE, siloxanes, polyisoprene and natural rubbers; wherein the coating formulation is a paint formulation selected from the group consisting of oil, acrylic, latex, enamel, varnish, water reducible, alkyd, epoxy, polyester-epoxy, acrylic-epoxy, polyamide-epoxy, urethane-modified alkyd, and acrylic-urethane; and wherein the coating has a coating selected from the group consisting of industrial coatings, residential coatings, furnace coatings, engine component coatings, pipe coatings, and oil field coatings.

In an embodiment, polysilocarb effects pigments, coatings, coating formulations and materials have one or more of the following features: wherein 20 weight % to 80 weight % of the carbon is free carbon; wherein 20 weight % to 80 weight % of the carbon is silicon-bound-carbon; wherein the formulation is selected from the group consisting of paint, powder coat, adhesive, nail polish, and ink; wherein the black polymer derived ceramic material has a particle size of less than about 1.5 μm; wherein the black polymer derived ceramic material has a particle size $D_{50}$ of from about 1 μm to about 0.1 μm; wherein the coating defines a blackness selected from the group consisting of: PMS 433, Black 3, Black 3, Black 4, Black 5, Black 6, Black 7, Black 2 2x, Black 3 2x, Black 4 2x, Black 5 2x, Black 6 2x, and Black 7 2x; wherein the coating defines a blackness selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2; and a jetness value of at least about 200 $M_y$; wherein the formulation is essentially free of heavy metals; wherein the formulation has less than about 100 ppm of heavy metals; wherein the formulation has less than about 10 ppm heavy metals; wherein the formulation has less than about 1 ppm heavy metals; wherein the formulation has less than about 0.1 ppm heavy metals; wherein the coating is essentially free of heavy metals; wherein the coating has less than about 100 ppm of heavy metals; wherein the coating has less than about 10 ppm heavy metals; wherein the coating has less than about 1 ppm heavy metals; wherein the coating has less than about 0.1 ppm heavy metals; wherein the pigment has less than about 10 ppm heavy metals, less than about 1 ppm heavy metals, and less than about 0.1 ppm heavy metals; and wherein the heavy metals are Cr and Mn.

In an embodiment, polysilocarb effects pigments are in a paint formulation having: a resin, a solvent, and a polymer derived ceramic pigment having from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon.

In an embodiment, polysilocarb effects pigments, coatings, coating formulations and materials have one or more of the following features: wherein the polymer derived ceramic pigment has a primary particle $D_{50}$ size of from about 0.1 μm to about 2.0 μm; wherein the polymer derived ceramic pigment is loaded at from about 1.5 pounds/gallon to about 10 pounds/gallon; wherein the resin is selected from the group of resins consisting of thermoplastic acrylic polyols, Bisphenol A diglycidal ether, silicone, oil based, and water-reducible acrylic; wherein the formulation has less than about 0.01 ppm of heavy metals; wherein the formulation has less than about 0.1 ppm of heavy metals; wherein the formulation has less than about 1 ppm of heavy metals, and the paint formulation is a very high temperature coating, wherein the paint formulation is thermally stable to greater than 700° C.; wherein the formulation has less than about 10 ppm of heavy metals, and the paint formulation is a very high temperature coating; wherein the paint formulation is a very high temperature coating, and wherein the paint formulation is thermally stable to greater than 1000° C.; wherein the first material has a system selected from the group of systems consisting of acrylics, lacquers, alkyds, latex, polyurethane, phenolics, epoxies and waterborne; wherein the first material has a material selected from the group consisting of HDPE, LDPE, PP, Acrylic, Epoxy, Linseed Oil, PU, PUR, EPDM, SBR, PVC, water based acrylic emulsions, ABS, SAN, SEBS, SBS, PVDF, PVDC, PMMA, PES, PET, NBR, PTFE, siloxanes, polyisoprene and natural rubbers; wherein the coating formulation is a paint formulation selected from the group consisting of oil, acrylic, latex, enamel, varnish, water reducible, alkyd, epoxy, polyester-epoxy, acrylic-epoxy, polyamide-epoxy, urethane-modified alkyd, and acrylic-urethane; and wherein the coating has a coating selected from the group consisting of industrial coatings, residential coatings, furnace coatings, engine component coatings, pipe coatings, and oil field coatings.

In an embodiment, black polysilocarb derived ceramic effects pigment have from about 30 weight % to about 60 weight % silicon, from about 5 weight % to about 40 weight % oxygen, and from about 3 weight % to about 35 weight % carbon, and wherein 20 weight % to 80 weight % of the carbon is silicon-bound-carbon and 80 weight % to about 20 weight % of the carbon is free carbon.

In an embodiment, polysilocarb effects pigments, coatings, coating formulations and materials have one or more of the following features: wherein the pigment is a UV absorber; wherein the pigment has an absorption coefficient of greater than 500 dB/cm/(g/100 g); wherein the pigment has an absorption coefficient of greater than 500 dB/cm/(g/100 g); wherein the pigment has an absorption coefficient of greater than 1,000 dB/cm/(g/100 g); wherein the pigment has an absorption coefficient of greater than 5,000 dB/cm/(g/100 g); wherein the pigment has an absorption coefficient of greater than 10,000 dB/cm/(g/100 g); wherein the pigment has an agglomerate of primary pigment particles; wherein the agglomerate has a size $D_{50}$ of at least about 10 µm; wherein the primary pigment particles have a size $D_{50}$ of less than about 1 µm; wherein the agglomerate has a strength $A_s$ and the primary particle has a strength $PP_s$ and $PP_s$ is at least 100 times greater than $A_s$; wherein the agglomerate has a strength $A_s$ and the primary particle has a strength $PP_s$ and $PP_s$ is at least 500 times greater than $A_s$; wherein the agglomerate has a strength $A_s$ and the primary particle has a strength $PP_s$ and $PP_s$ is at least 1,000 times greater than $A_s$; wherein the pigment has an oil absorption of less than about 50 g/100 g; wherein the pigment has an oil absorption of less than about 20 g/100 g; wherein the polymer derived ceramic pigment has a primary particle $D_{50}$ size of from about 0.1 µm to about 1.5 µm; wherein the polymer derived ceramic pigment has a primary particle $D_{50}$ size of greater than about 0.1 µm; wherein the polymer derived ceramic pigment has a primary particle $D_{50}$ size of less than about 10.0 µm; wherein the polymer derived ceramic pigment has a primary particle $D_{50}$ size of from about 0.1 µm to about 3.0 µm; wherein the polymer derived ceramic pigment has a primary particle $D_{50}$ size of from about 1 µm to about 5.0 µm; wherein the pigment is microwave safe; wherein the pigment is non-conductive; wherein the pigment is hydrophilic; and wherein the pigment is hydrophobic.

In an embodiment, polysilocarb formulations and effects pigments derived or made from that formulation may have metals and metal complexes. Thus, metals as oxides, carbides or silicides can be introduced into precursor formulations, and thus into a silica matrix in a controlled fashion. Thus, using organometallic, metal halide (chloride, bromide, iodide), metal alkoxide and metal amide compounds of transition metals and then copolymerizing in the silica matrix, through incorporation into a precursor formulation is contemplated.

For example, Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alky complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the Silicon precursor compounds and then treated with water to form the oxides at the same time as the polymer, copolymerize. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, about 20 mole percent or greater % and greater. The forgoing use of metals with the present precursor formulas can be used to control and provide predetermined stoichiometries.

In making the precursor formulation into a structure, or preform, the precursor formulation, e.g., polysilocarb formulation, can be, for example, formed using the following techniques: spraying, spray drying, atomization, nebulization, phase change separation, flowing, thermal spraying, drawing, dripping, forming droplets in liquid and liquid-surfactant systems, painting, molding, forming, extruding, spinning, ultrasound, vibrating, solution polymerization, emulsion polymerization, micro-emulsion polymerization, injecting, injection molding, or otherwise manipulated into essentially any volumetric shape. These volumetric shapes may include for example, the following: pellets, rings, lenses, disks, panels, squares, rectangles, angles, channels, hollow sealed chambers, sheets, coatings, films, skins, particulates, beams, rods, angles, slabs, columns, fibers, staple fibers, tubes, cups, pipes, and combinations and various of these.

In an embodiment, a system for forming polymer derived ceramic platelets has a means for forming a thin film of liquid polymer derived ceramic precursor material on a substrate means; and, a means for providing electromagnetic radiation to the thin film of liquid polymer derived ceramic.

In an embodiment, a method of forming a cured polymer derived ceramic from a liquid polymer derived ceramic precursors, has: a step for forming a thin layer of a liquid polymer derived ceramic precursor on a substrate; and, a step for curing the thin layer with electromagnetic radiation.

The ability of a coating to hiding the substrate, i.e., hiding, is a property that can be affected by many factors. Generally, hiding increases as film or coating thickness increases at the same pigment loading. Lower hiding coatings require thicker films. Also, hiding increases as pigment particle size decreases until a maximum hiding is reached and then hiding begins to decrease. Two coatings will hide the substrate the same, one with a lower pigment loading (of smaller particle size) and one with a higher pigment loading of a larger particle size. In general, embodiments of the polymer derived black ceramic pigments, and preferably black polysilocarb derived ceramic pigments, provide higher hiding coatings, or hiding ability, for the same loading (e.g., weight of pigment to volume of coating) of black mixed metal oxide pigments and more quickly approach the hiding power of furnace carbon black.

TABLE 1

| Pigment Type | Particle size (micron) | Pigment loading to hiding |
| --- | --- | --- |
| PolySiloCarb | 2.5 to 3.5 | 1 lb/gallon to 1.5 lbs/gallon |
| PolySiloCarb | 1.5 to 2.5 | 0.8 lbs/gallon to 1 lb/gallon |
| PolySiloCarb | 1.0 to 1.5 | 0.7 to 0.8 lbs/gallon |
| PolySiloCarb | 0.8 to 1.0 | 0.6 to 0.7 lbs/gallon |
| PolySiloCarb | 0.6 to 0.8 | 0.55 to 0.60 lbs/gallon |
| PolySiloCarb | 0.4 to 0.6 | 0.45 to 0.55 lbs/gallon |

TABLE 1-continued

| Pigment Type | Particle size (micron) | Pigment loading to hiding |
| --- | --- | --- |
| PolySiloCarb | 0.2 to 0.4 | 0.35 to 0.45 lbs/gallon |
| PolySiloCarb | 0.1 to 0.2 | 0.25 to 0.35 lbs/gallon |
| PolySiloCarb | less than 0.1 | less than 0.25 lbs/gallon |
| Cl Black 28 | about 0.5 | about 0.5 lbs/gallon |
| Cl Black 26 | about 0.3 | about 0.3 lbs/gallon |
| Thermal Carbon Black | 0.25 to 0.35 | about 0.4 lbs/gallon |
| FurnaceCarbon Black | 0.03-0.05 | 0.1 to 0.2 lbs/gallon |

Pigment loading to hiding is the required weight of pigment in a 50 micron dry film coating to cover a black and white substrate such that the eye cannot differentiate a difference in color over either colored background.

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions. The percentages used in the examples, unless expressly provided otherwise, are weight percents of the total, e.g., formulation, mixture, product, or structure. The usage X/Y or XY indicates % of X and the % of Y in the formulation, unless expressly provided otherwise. The usage X/Y/Z or XYZ indicates the % of X, % of Y and % of Z in the formulation, unless expressly provided otherwise.

Example 1

Figure 2:
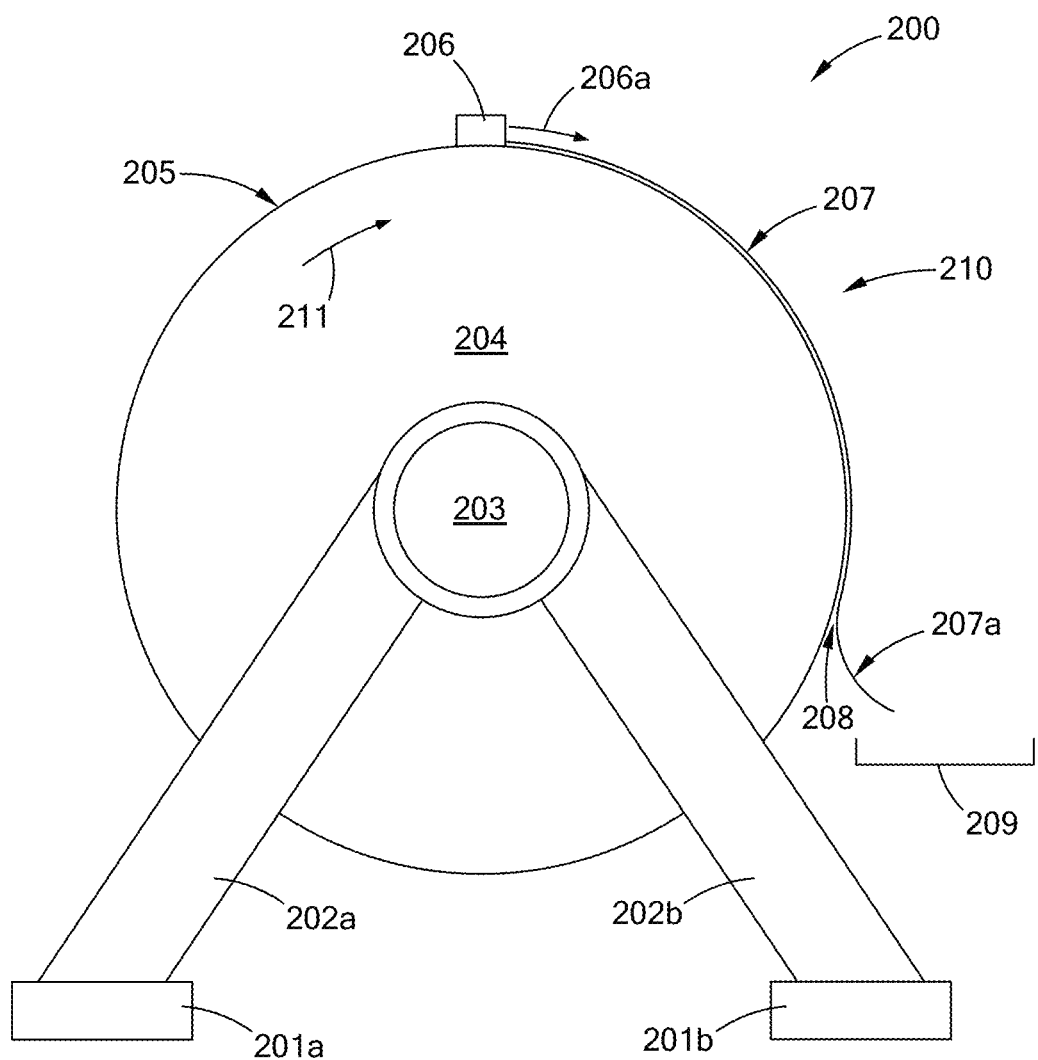
FIG. 2 is a schematic cross section of an embodiment of a drum forming apparatus in accordance with the present inventions.

Turning to FIG. 2 there is illustrated a rotary forming apparatus 200. The apparatus 200 has a base 201a, 201b, that supports a frame 202a, 202b that is attached to and holds a drive hub 203. The drive hub 203 is attached to and rotates drum 204. Drum 204 rotates in the direction of arrow 211, and has a speed of rotation in the direction of arrow 211.

Drum 204 has a forming surface 205. A PDC precursor distribution device 206 is positioned near the drum 204 and next to, or on the forming surface 205. The placement of the distribution device 206 can vary depending upon the type of device, the desired thickness of the film to be laid down on the forming surface 205, the speed of the drum, the speed and direction at which the precursor is laid down on the surface and other factors. In general, the distribution device 206 should be at or near the surface 205 of the drum to permit rotation, yet form any necessary seals to provide for an efficient and neat laying down of the film onto the rotating drum 204 surface 205.

The distribution device 206 distributes the precursor on the rotating drum surface 205 to form a PDC film 207. The film precursor is moving in the direction of arrow 206a as it is laid down on the drum surface 205. The PDC film 207 is then cured on the drum surface 205 in curing area 210. The cured PDC film 207a is then removed from the drum surface 205 by removal device 208. The PDC film 207a is then collected in container 209 for further processing, use or distribution.

The rotating hub 203 has drive means, such as motors, and is in control communication with a control system. In this manner the drum's rotation speed in direction 211 can be preferably precisely controlled. If the drum also has temperature control elements for controlling the temperature of the drum surface (e.g., heating, cooling, constant predetermined temperature in different zones or locations) these elements are preferably associated with the control system as well.

The distribution device 206 can be a forming section with a slice opening, it can be a wiper blade, it can be a series of rollers, it can be a rollers and a nip forming a reservoir, it can be a spray boom, it can be a liquid curtain forming device as well as other apparatus know or later developed for laying down thin films onto a retaining surface. In some embodiments it is preferable to control the temperature of the distribution device 206, and control the temperature of the precursor in the device 206.

The speed of the film 207 as it is laid down and moving in direction 206a can be the same speed as the surface 205 of the drum moving in direction 211. The speed of the film 207 as it is laid down and moving in direction 206a can be faster than the speed of the surface 205 of the drum moving in direction 211 (i.e., the film is rushed). The speed of the film 207 as it is laid down and moving in direction 206a can be slower than the speed of the surface 205 of the drum moving in direction 211 (i.e., the film is dragged). In an embodiment to obtain thin films, e.g., less than 1 μm, less than 0.5 μm, less than 0.1 μm, the film 207 can be dragged to cause the film to be thinned down while on the surface of the drum.

The curing zone 210 can have external heating or curing devices, such as disclosed and discussed in this specification, it can have heating elements to raise the temperature of the drum surface 205, and combinations and variations of these. In some embodiments, for particular precursor formulations, no heating elements will be necessary, as the precursor film will cure under ambient conditions.

The film 207a can be at any level of cure that is desirable and meets the requirements of use or further processing. Although shown as being removed as an intact film 207a, it should be understood that the film may be broken up into flakes, platelets, or powders by the force of the removal device 208, which could be for example a doctor blade, air knife, water jet, roller, or scraper to name a few, removing the film from the drum surface 205. In a preferred embodiment to make flakes for use as, among other things, effects pigments, the film is cured to the extent that it is sufficiently brittle to be broken into small flat flakes, by the removal device 208. Preferably these flakes then essentially hold their shape as they are collected in container 209.

The drum surface 205 may be metal, highly polished metal, stone, TEFLON (e.g., Polytetrafluoroethylene ("PTFE")), stainless steel, a release material, or other materials.

The removal device 208 can be a doctor blade, roller, counter rotating roller, scraper, and an air knife, to name a few, as well as combinations and various of these and other devices know to those of the art to remove a film or sheet from a rotating drum or moving surface. The removal device 208 can be positioned at any position around the drum. Thus, it can be close to the forming device 206, or it can be further away from that device, depending primarily on how long the film is desired to be in contact with the drum surface.

Example 2

Figure 3:
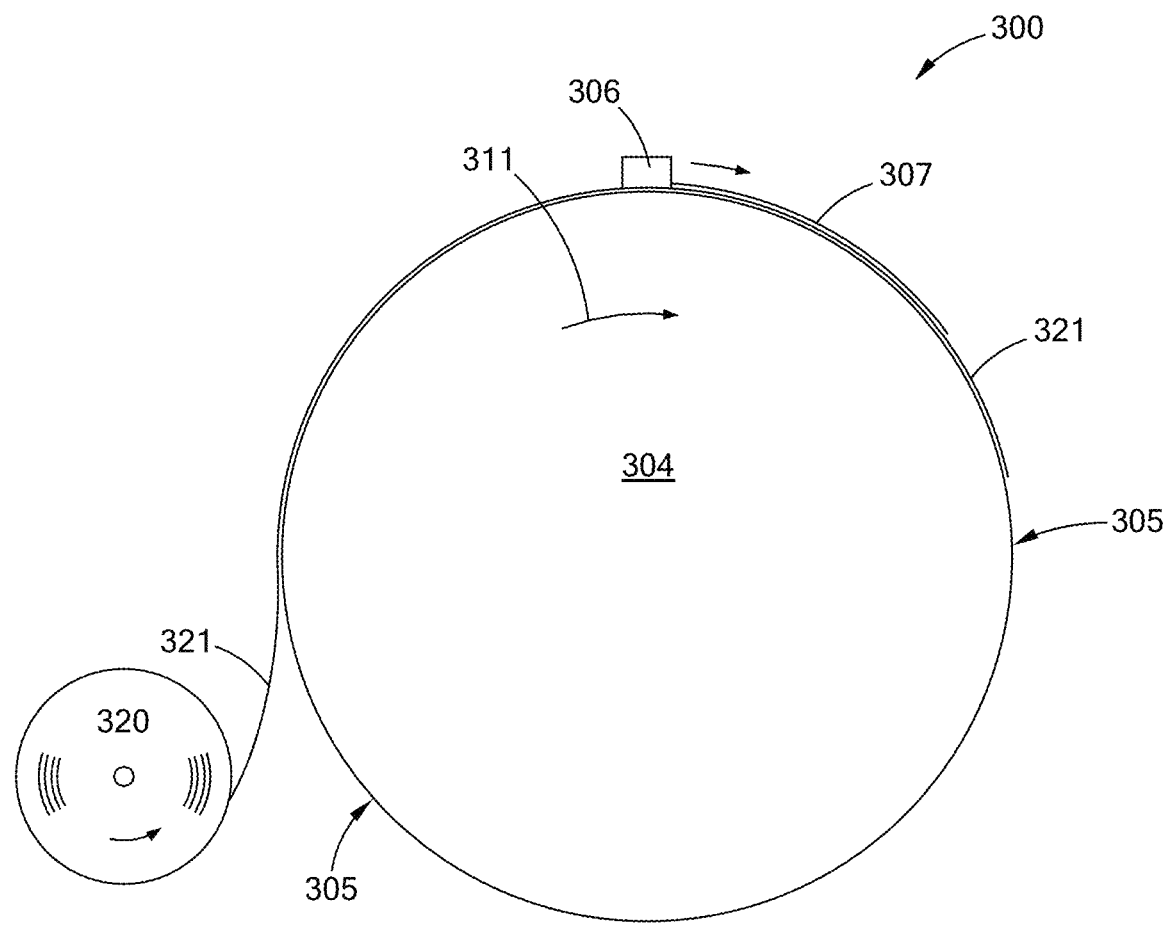
FIG. 3 is a schematic cross section of an embodiment of a substrate and drum forming apparatus in accordance with the present inventions.
Figure 4A:
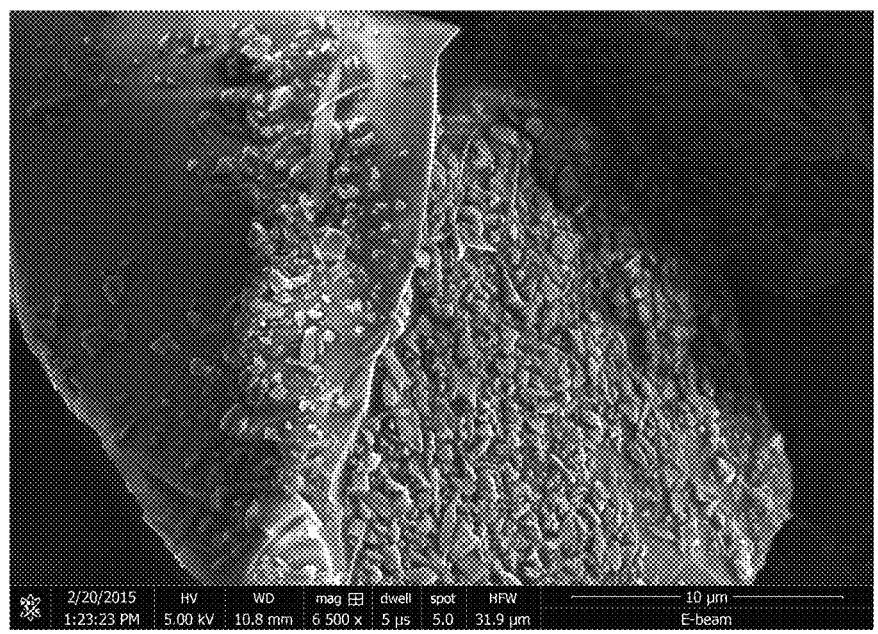
FIG. 4A is a SEPM of an embodiment of a polysilocarb derived ceramic pigment, in accordance with the present inventions. SEPM legend—HV 5.00 kV, WD 10.8 mm, magnification 6,500×, dwell 5 μs, spot 5.0, HFW 31.9 μm.
Figure 4B:
FIG. 4B is an SEPM of an SiOC effects pigment in accordance with the present invention made by the water floating formation method in accordance with the present invention. SEPM legend—300 μm (scale) 270×5 kV—Image Mar. 22 2016 993 μm BSD Full.
Figure 4C:
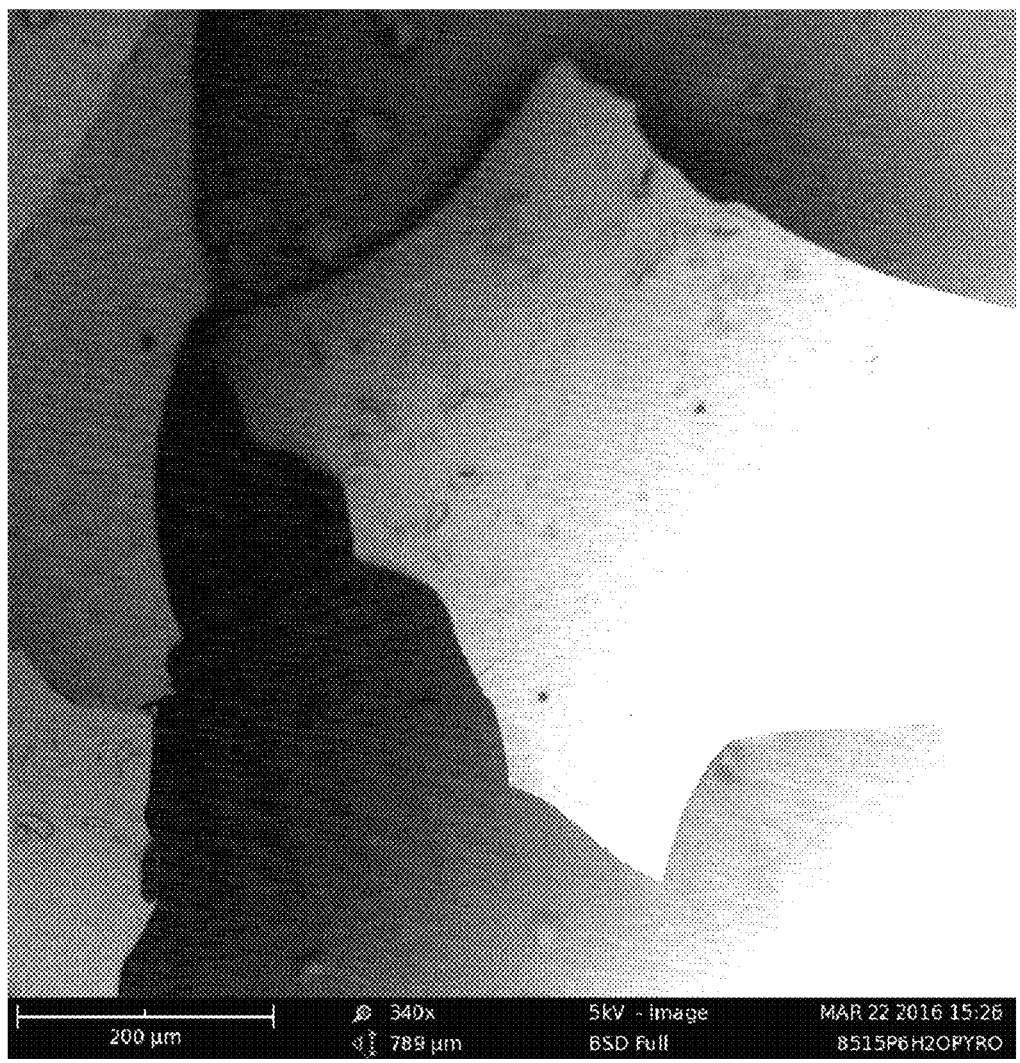
FIG. 4C is an SEPM of an SiOC effects pigment in accordance with the present invention. SEPM legend—200 μm (scale) 340×5 kV—Image Mar. 22 2016 789 μm BSD Full.
Figure 4D:
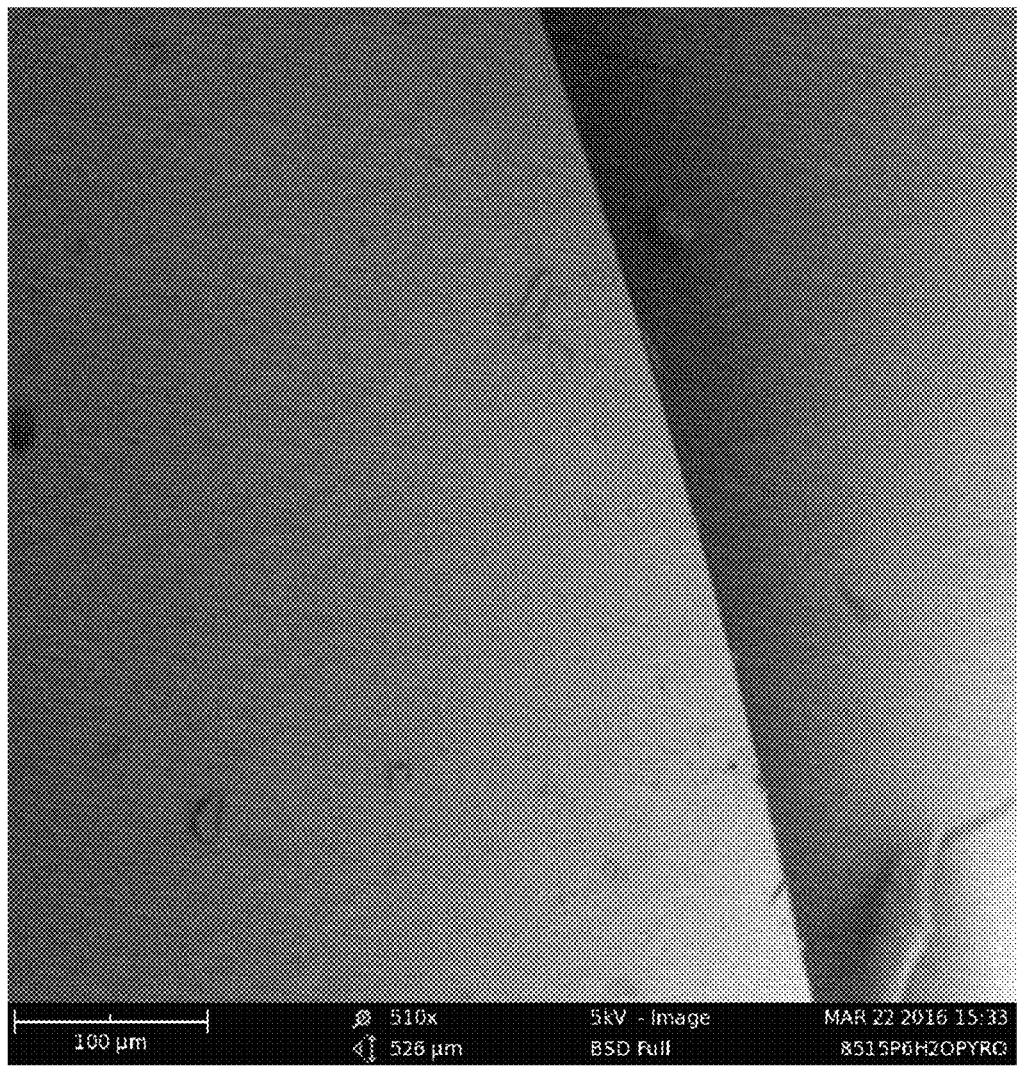
FIG. 4D is an SEPM of an SiOC effects pigment in accordance with the present invention. SEPM legend—100 μm (scale) 510×5 kV—Image Mar. 22 2016 526 μm BSD Full.

Turning to FIG. 3 there is illustrated a substrate-rotatory forming apparatus 300. The forming apparatus 300 has a forming drum 304 that is rotating in the direction of arrow 311. Preferably the apparatus 300 has similar drive and control equipment as the embodiment of FIG. 2. The apparatus 300 has a roll 320 of disposable substrate material 321. The substrate 321 is unwound and placed on the drum 304 surface 305. As the substrate 321 is rotated with the drum surface 305 it passes under the forming device 306 and a film 307 of precursor material is laid down on the substrate 321. Although not show in the figure, as the drum continues to rotate the substrate 321-film 307 comes back around to the point on the drum 304 where the substrate 321 is being laid down on the drum, and will be laid down on the film 307. In this manner a multilayered structure of substrate/PDC film/substrate/PDC film/etc. can be built up. While on the drum 304 this multilayer structure will be spiral wrapped around the drum. Once removed from the drum, the substrate can be removed by known substrate removal techniques, leaving only the PDC film (which preferable is or has broken into flakes)

The precursor can be rushed, dragged or laid down at the same speed of the drum's rotation.

Example 3

Figure 5:
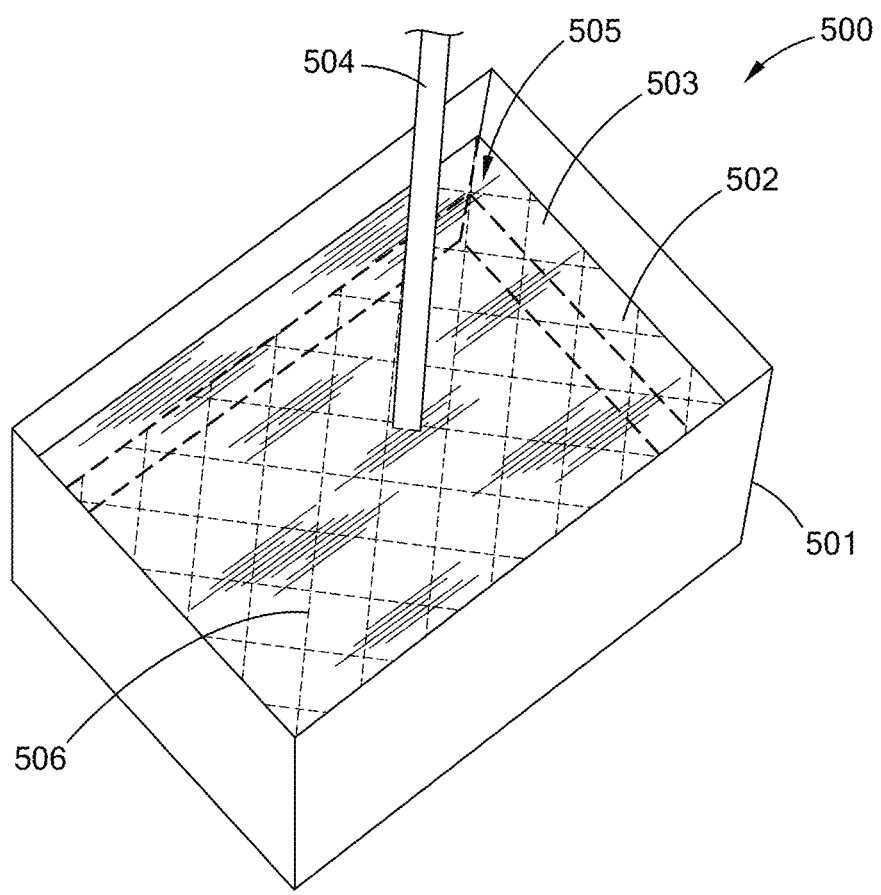
FIG. 5 is a perspective view of an embodiment of a fluid forming apparatus in accordance with the present inventions.
Figure 5A:
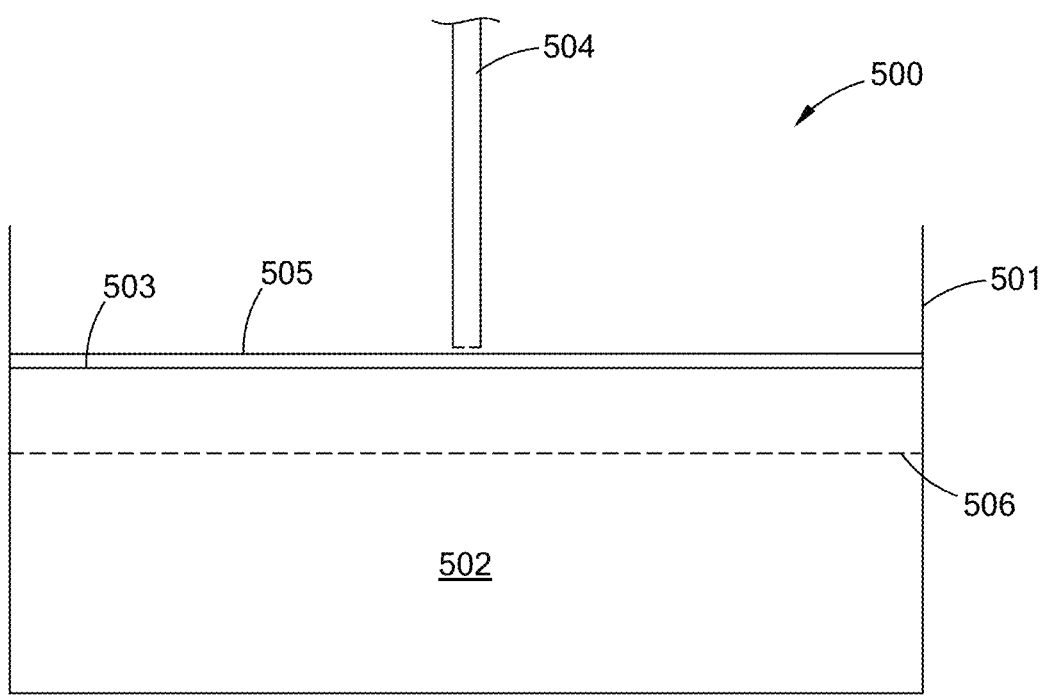
FIG. 5A is a cross sectional view of the apparatus of FIG. 5.

Turning to FIGS. 5 (perspective view) and 5A (cross-sectional view) there is illustrated an embodiment of a fluid based film forming apparatus 500. The apparatus 500 has a tray 501 that is filled with a fluid 502, that has a fluid surface 503. The precursor is added by addition device 504 and flows across the fluid surface 503 to form a thin PDC film 505. The end of the addition device 504 preferable is close to the fluid surface 503, e.g., less than 5 inches, less than 3 inches, less than 1 inch, less than ½ inch and less than ⅛ inch. Preferably this distance and the flow rate of the precursor onto the surface 503 should be such as to minimally disrupt the smoothness of surface 503, e.g., avoid making ripples, keeping the fluid quiescent. The film 505 can be cured by having the fluid temperature at an elevated level, by having external curing devices, as for example disclosed in this Specification, and combinations and variations of these. Upon cure submerged screen 506 is lifted up and out of the fluid carrying the cured PDC film (or flakes or particles) away from the tray 506.

The fluid may be water or other liquid that is non-reactive with the precursor formulation and that the precursor formulation is not soluble in. The fluid can be for example water, distilled water, deionized water, salt water, water with acetic acid. Additionally, the fluid can include additives to increase wettability, surfactants, spreading agents, dissolved salts, corrosion inhibitors, glycols for diluting solvents, alcohols such as isopropanol, xylene, mineral spirits, hexanes, and cyclosiloxanes. The fluid should have a greater density than the precursor formulation, which enables the precursor to float on top of the fluid, and spread into a thin film on the top of the fluid. The thickness of the film can be determined by the area of the fluid surface 503 and the volume of precursor added to the surface. The viscosity of the precursor preferably is preferably low, to permit fast and even spreading across the fluid surface 503. The precursor formulation can be diluted, for example with acetone, to further lower the viscosity and enhance spread ability and flow ability. The diluent may also serve to lower the density of the precursor.

Example 3A

The apparatus 500 is operated with the fluid temperature between 50° C. and 100° C. and the precursor temperature between 25° C. and 70° when leaving the delivery device.

Example 3B

The apparatus 500 does not utilize the removal screen 506. In this embodiment the cured film 505 has sufficient strength to be lifted from the fluid 502.

Example 3C

The apparatus 500 has a fabric that can either be laid atop the cured film, or drawn up through the fluid. In this manner the cured film is carried away by the fabric.

Example 4

The precursor is spread into a screen. The screen has openings at a predetermined size and shape. The openings are filled with the precursor and excess is removed from the screen. The material is then cured and the PDC platelets in the shape of the screen opening are removed from the screen, by for example forced air or vibration. If the screen is made from a ceramic material, graphite or other material capable of handling pyrolysis temperature, or is made from a material that can be burned off during pyrolysis, the PDC material can be cured and pyrolized while in the screen.

Example 5

Polysilocarb ceramic effect thin flakes have an average thickness of about 1.2 microns and can be coated with metals to give superior reflection and brilliance to any application. These flakes may be used as both a functional and a decorative pigment. The properties of these flakes are set forth in Tables 3a and 3b.

TABLE 3a

| Nominal thickness uncoated μm | Particle Size Diameter μm | Oil Absorption g/100 g | Coated thickness μm | pH (10% aqueous suspension) | Loss on Drying |
|---|---|---|---|---|---|
| 1.2 | D10-5 D90-40 | 60-100 | 1.21-2.21 | 7.0-11.0 | <0.5% |

TABLE 3b

| Trace Elements | Less than |
|---|---|
| Mercury (Hg) | 0.1 ppm |
| Arsenic (As) | 0.1 ppm |
| Lead (Pb) | 0.1 ppm |
| Cadmium (Cd) | 0.1 ppm |
| Barium (Ba) | 0.1 ppm |
| Antimony (Sb) | 0.1 ppm |
| Chromium (Cr) | 0.1 ppm |
| Nickel (Ni) | 0.1 ppm |

Example 6

Polysilocarb ceramic effect thin flakes have an average thickness of about 1.2 microns and can be coated with high refractive index metal oxides, to provide unique pigments that can display strong interference colors combined with high transparency and extraordinary gloss. The properties of these flakes are set forth in Tables 4a and 4b.

TABLE 4a

| Nominal thickness uncoated μm | Particle Size Diameter μm | Oil Absorption g/100 g | Coated thickness μm | pH (10% aqueous suspension) | Loss on Drying |
|---|---|---|---|---|---|
| 1.2 | D10-20 D90-100 | 60-100 | 1.21-2.21 | 7.0-11.0 | <0.5% |

TABLE 4b

| Trace Elements | Less than |
|---|---|
| Mercury (Hg) | 1.0 ppm |
| Arsenic (As) | 1.0 ppm |
| Lead (Pb) | 1.0 ppm |
| Cadmium (Cd) | 1.0 ppm |
| Barium (Ba) | 1.0 ppm |
| Antimony (Sb) | 1.0 ppm |
| Chromium (Cr) | 1.0 ppm |
| Nickel (Ni) | 1.0 ppm |

Example 7

Polysilocarb ceramic effect thin flakes have an average thickness of about 1.0-1.3 microns. The properties of these flakes are set forth in Tables 5. The surface of the flakes can be treated with silanes, silane coupling agents, including for example hexamethyldisilazane, 3-aminopropyltriethoxy silane, vinyl trimethoxy silane, y-glycidoxypropyltrimethoxy silane, and methacryloxypropyltrimethoxy silane. The particle size distribution is 100-300 μm (10% or less), 300-50 μm (65% or more), and <50 μm (25% or less).

TABLE 5

| Apparent Density | 0.15 g/cc |
|---|---|
| Real Density | 2.1 g/cc |
| Softening Temp | >650° C. |
| Melt Temperature | >650° C. |
| Refractive Index | 1.8 |

Example 8

Polysilocarb ceramic effect thin flakes have an average thickness of about 1.0-1.3 microns. The particle size distribution is 1700-150 μm (80% or more) and <150 μm (20% or less).

Example 9

Polysilocarb ceramic effect thin flakes have an average thickness of about 0.8-1.0 microns. The particle size distribution is D10≤6.00 μm, D50 11.0-14.50 μm, and D90 21.00-25.00 μm (with sieve residue 45 μm less than 2.00).

Example 10

Polysilocarb ceramic effect thin flakes have an average thickness of about 0.5-0.9 microns. The particle size distribution is D10 5.0-9.0 µm, D50 17.0-23.00 µm, and D90 35.0-45.0 µm (with sieve residue 40 µm less than 1.00%).

Example 11

Polysilocarb ceramic effect thin flakes have an average thickness of about 1.0 microns. The particle size distribution is D10 10.0-20.0 µm, D50 25.0-35.00 µm, and D90 55.0-65.0 µm.

Example 12

Polysilocarb ceramic effect thin flakes have an average thickness of about 1.0 microns. The particle size distribution is D10 9.0-13.0 µm, D50 20.0-25.00 µm, and D90 37.0-93.0 µm.

Example 13

Polysilocarb ceramic effect thin flakes have an average thickness of about 2.0 microns. The particle size distribution is D10 10.0-14.0 µm, D50 20.0-25.00 µm, and D90 35.0-41.0 µm.

Example 14

Polysilocarb ceramic effect thin flakes have an average thickness of about 1.0 microns. The particle size distribution is D10 10.0-14.0 µm, D50 20.0-25.00 µm, and D90 35.0-41.0 µm.

Example 15

A paste having polysilocarb ceramic effect thin flakes have an average thickness of about 1.0 microns has a non-volatile content (i.e., pigment flakes) of about 63.0-67.0% and a volatile content of about 330%-37.0%. The particle size distribution for the flakes is D10 2.0-6.0 µm, D50 11.0-17.00 µm, and D90 27.0-35.0 µm.

Example 16

A paste having polysilocarb ceramic effect thin has a non-volatile content (i.e., pigment flakes) of about 63.0-67.0% and a volatile content of about 330%-37.0%. The particle size distribution for the flakes is D10 2.0-6.0 µm, D50 11.0-17.00 µm, and D90 27.0-35.0 µm.

Example 17

Polysilocarb ceramic effect thin flakes have particle size distribution for the flakes is D10~10 µm, D50~21 µm and D90~39 µm.

Example 18

Multifunctional silanes, such as tetraethoxysilane, vinyltrimethoxysilane, methyltrimethoxysilane, etc., are hydrolyzed with water and condensed to rigid products, a sol-gel process, with low coefficient of thermal expansion. A coating made with a hydrolyzed and partially condensed silane is used as a silicone hardcoat to protect the underlined substrate from scratching. Such coatings tend to wet substrates well and can be easily flow coat on substrate to make thin coatings. Although the wet coating coats well on most substrates the cured coating adhere to very few substrates. The "green" coating with very low level of condensation often cracks when it is heated to cure due to the very high shrinkage caused by the high concentration of crosslinking. Pyrolysis of the cured coating to 1150° C. makes silicon oxycarbide with high reflective index. These pyrolyzed flakes have metallic appearance.

The easy wetting, lack of adhesion of the cured coating, cracking from curing, and metallic appearance of the pyrolyzed coating can be useful for manufacturing metallic effect pigments. In one embodiment, an organosilane, vinyltrimethoxysilane, is mixed with water and alcohol at ambient condition. Acid is added to catalyze hydrolysis and condensation to make partially condensed silane coating solution. The coating solution is used to flow coat a metal substrate. The coating is allowed to air dry before it is cured with heat. The coated substrate is allowed to cool to room temperature with air. At this time, the cured coating is mostly cracked and loosely adhered to the metal substrate. The cured coating can be removed by pressurized air gun or mechanical rubbing to produce small flakes. These flakes are subsequently pyrolyzed at 1150° C. to produce metallic flakes.

Example 19

5 g vinyltrimethoxysilane, 7.11 g isopropanol, and 4.28 g of an aqueous solution of 5% acetic acid is mixed in a glass vial with a magnetic stirrer at room temperature for 16 hours.

Figure 9A:
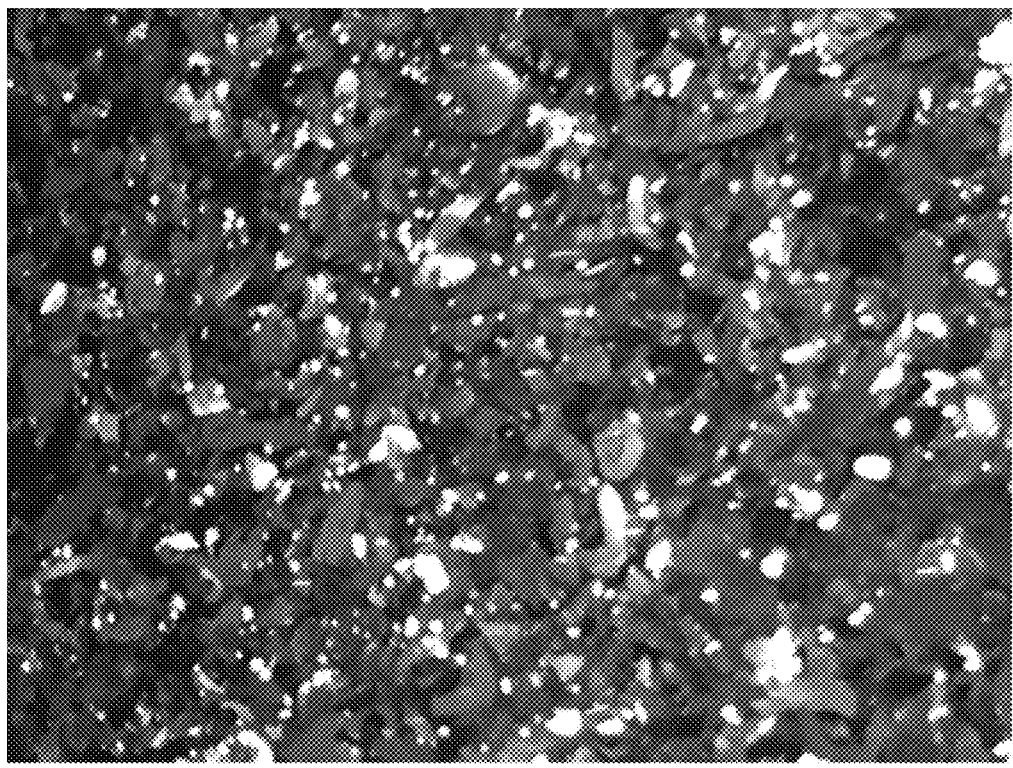
FIG. 9A is a photograph of an embodiment of a polysicocarb metallic effects pigment in accordance with the present invention.
Figure 9B:
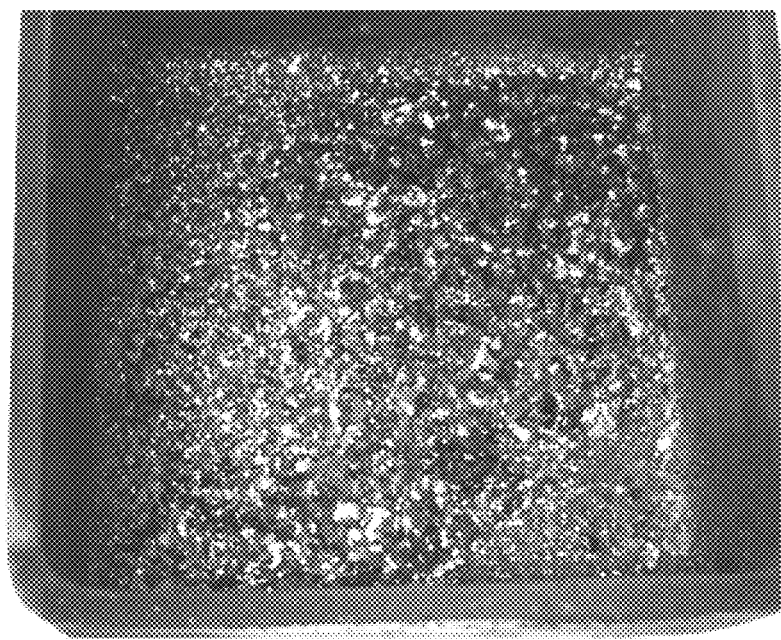
FIG. 9B is a photograph of an embodiment of a polysicocarb metallic effects pigment in accordance with the present invention.
Figure 9C:
FIG. 9C is a photograph of an embodiment of a polysicocarb metallic effects pigment in accordance with the present invention.

The solution is applied to the bottom of aluminum cups. The cups are tilted vertically to allow coating to flow from one end to the other. After the entire cup bottom is covered, the excess liquid was removed. The coating is allowed to dry in air for 10 minutes and the dried coated aluminum cup is transferred to a 125° C. oven. The coating is allowed to cure for 1 hour at 125° C. The cured coating is allowed to cool with air, cracks while cooling. Once the coating has cooled down to ambient, the thin flake-like coating is removed by rubbing, e.g., with fingers. The flakes are collected in a crucible and heated to 1150° C. under nitrogen in a furnace for 5.5 hours to afford metallic flakes, as shown in the photograph of FIGS. 9A, 9B, and 9C.

Example 20

A polymer derived ceramic black pigment having 44% Si, 31% O, and 25% C (with 27.3% of the carbon being the Si—C bonded type, and the remaining carbon being the free carbon type), is used in structural components, members, abrasives, devices and applications set forth in this specification.

Example 21

A polymer derived ceramic black pigment having 50% Si, 20% O, and 30% C (with 25% of the carbon being the Si—C bonded type, and the remaining carbon being the free carbon type), is used in structural components, devices and applications for the ceramics that are set forth in this specification.

Example 22

A polysilocarb batch having 75% MH, 15% TV, 10% VT and 1% catalyst (10 ppm platinum and 0.5% Luperox 231 peroxide) is cured and pyrolyzed to form a ceramic suitable for several applications including as a black ceramic effects pigment.

Example 23

A polysilocarb batch having 70% MH, 20% TV, 10% VT and 1% catalyst (10 ppm platinum and 0.5% Luperox 231 peroxide) is cured and pyrolized to form a ceramic suitable for several applications including as a black ceramic effects pigment.

Example 24

A polysilocarb batch having 50% by volume carbon black is added to a polysilocarb batch having 70% MH, 20% TV, 10% VT and 1% catalyst (10 ppm platinum and 0.5% Luperox 231 peroxide) is cured and pyrolized to form a ceramic suitable for several applications including as a black ceramic filled effects pigment.

Example 25

A polysilocarb formulation is pyrolized in the form of a volumetric structure. The ceramic polysilocarb derived volumetric structure exhibits reflective and refractive optical properties, such as opalescence, shine, twinkle, and sparkle. These optical properties are present when the structure is black in color, (e.g., no colorant has been added to the formulation); or if the structure is colored (e.g., any color other than black, e.g., white, yellow, red, etc.).

Example 26

The volumetric structures of Example 25 are small beads that are black and exhibit a twinkle, opalescence or shin. These beads are incorporated into a paint formulation. The patent formulation is for example applied to automobiles or appliances. It provides a flat or mat finish, which is for example popular on newer BMWs and Mercedes, but adds to that mat finish an inner sparkle or luster. Thus, the polysiloxane based paint formulation provides a sparkle mat finish to an automobile, appliance or other article.

Example 27

Pyrolized polysilocarb beads having a size of from about 100 to about 1,000 microns are added to a paint formulation at a loading of from about 1% to about 40%.

Example 28

The paint of Example 27 in which the paint formulation, is an automotive paint, and is colored blue and the beads are the same blue color as the paint, and have size of 350 microns (+/−5%) and a loading of about 25%.

Example 29

The paint of Example 27 in which the beads are not colored, i.e., they are black, and have a size ranging from about 300-500 microns, and the paint is a black, although not necessarily the same black as the beads.

Example 30

A latex paint formulation having pyrolized polysilocarb power added into the formulation, the power has a size range of about 0.5-100 microns, and the powder has a loading of about 15%.

Example 31

The paint formulation of Example 29 is an enamel.

Example 32

A high-solids acrylic enamel mill base having 25% solvent (butyl acetate), 20%≤0.2 μm polysilocarb ceramic pigment, and 55% resin. The mill base is then added to an acrylic isocyanate base at a ratio of 1:3. The acrylic enamel is sprayed onto a metal substrate and exhibits the following features Gloss 20 degrees 95%, Gloss 60 degrees 99%, Color Development L 25, a 0, b −0.5

Example 33

A polysilocarb formulation is pyrolized in the form of a volumetric structure. The ceramic polysilocarb derived volumetric structure exhibits reflective and refractive optical properties, such as opalescence, shine, twinkle, and sparkle. These optical properties are present when the structure is black in color, (e.g., no colorant has been added to the formulation); or if the structure is colored (e.g., any color other than black, e.g., white, yellow, red, etc.).

Example 34

The volumetric structure of Example 14 is a work surface, such as a table top, a bench top, an insert, or a kitchen counter top, to name a few.

Example 35

The volumetric structure of Example 16 has other colorings or additive to provide simulated granite like appearance.

Example 36

The volumetric structures of Example 33 are small beads that are black and exhibit a twinkle, opalescence or shin. These beads are incorporated into a paint formulation. The patent formulation is for example applied to automobiles or appliances. It provides a flat or matte finish, which is for example popular on newer BMWs and Mercedes, but adds to that matte finish an inner sparkle or luster. Thus, the polysiloxane based paint formulation provides a sparkle matte finish to an automobile, appliance or other article.

Overview—Polysilocarb Formulations, Methods & Materials

Formulations, processes, methods of making, and compositions for various polysilocarbs are taught and disclosed in U.S. Pat. Nos. 9,499,677, 9,481,781 and US Patent Publication Nos. 2014/0274658, 2014/0323364, 2015/0175750, 2016/0207782, 2016/0280607, 2017/0050337, the entire disclosure of each of which are incorporated herein by reference.

General Processes for Obtaining a Polysilocarb Precursor

Typically, polymer derived ceramic precursor formulations, and in particular, polysilocarb precursor formulations, can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms, i.e., process types, are not, and should not be viewed as, limiting. For example, the reaction type process can be used to create a precursor material that is then used in the mixing type process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end, and final products. Depending upon the specific process and desired features of the product, the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

The precursor formulations may be used to form a "neat" material (by "neat" material it is meant that all, and essentially all of the structure is made from the precursor material or unfilled formulation; and thus, for example, there are no fillers or reinforcements). The precursor formulations may be used to form a filled material, e.g., having an additive or other material in addition to the precursors. They may be used to form composite materials, e.g., structures or coatings having other materials such as reinforcements in them. They may be used to form non-reinforced materials, which are materials that are made of primarily, essentially, and preferably only from the precursor materials, e.g., minimally filled materials where the filler is not intended to add or enhance strength, and unfilled materials. They may be sued to form reinforced materials, for example materials having fibers or other materials to add strength, abrasion resistance, durability, or other features or properties, that generally are viewed as strength related in a broad sense.

In general, types of filler material include, for example: inert fillers, such as inorganic materials that do not react with the SiOC matrix during curing, pyrolysis or use; reactive fillers, such as zirconium, aluminum hydroxide, and boron compounds that react with the SiOC matrix during curing, pyrolysis, use, or combinations of these; and, active fillers, such as materials that are released during the use of the end product to provide specific features to that product, e.g., lubricant. A filler may come under more than one of these types.

The filler material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. For example, organometallic, metal halide (chloride, bromide, iodide), metal alkoxide and metal amide compounds of transition metals can be copolymerized in the silica matrix, through incorporation into a precursor formulation.

The filler material can impart, regulate or enhance, features and properties, for example, electrical resistance, magnetic capabilities, band gap features, p-n junction features, p-type features, n-type features, dopants, electrical conductivity, semiconductor features, anti-static, optical properties (e.g., reflectivity, refractivity and iridescence), chemical resistivity, corrosion resistance, wear resistance, abrasions resistance, thermal insulation, UV stability, UV protective, and other features or properties that may be desirable, necessary, and both, in the end product or material.

Thus, filler materials could include copper lead wires, thermal conductive fillers, electrically conductive fillers, lead, optical fibers, ceramic colorants, pigments, oxides, dyes, powders, ceramic fines, polymer derived ceramic particles, pore-formers, carbosilanes, silanes, silazanes, silicon carbide, carbosilazanes, siloxane, metal powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, polymer derived ceramic particles, e.g., fines or beads, can be added to a polysilocarb formulation and then cured to form a filled cured plastic material, which has significant fire resistant properties as a coating or in a device or component of a device.

The polysilocarb precursor formulations may be used with reinforcing materials to form composite layers or coatings. Thus, for example, the formulation may be flowed into, impregnated into, absorbed by or otherwise combined with a thin reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 37.8° C. (100° F.) to about 204.4° C. (400° F.), the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber, cured into a solid, pyrolized into a ceramic, or it may be made from a different precursor formulation material, which has been formed into a fiber, pyrolized into a ceramic and combinations and variations of these. In addition to ceramic fibers derived from the precursor formulation materials that may be used as reinforcing material, other porous, substantially porous, and non-porous ceramic structures derived from a precursor formulation material may be used.

The polysilocarb material (e.g., precursor batch, precursor, formulation, bulk liquid, etc.), can have various inhibitors, catalysts and initiator present that inhibit, regulate, or promote curing, under predetermined conditions. Thus, the polysilocarb coating material can have sufficient inhibitors present, or the absence of a catalyst, to provide the required shelf life for the material in storage.

The Mixing Type Process

Precursor materials may be a methyl hydrogen (methyl terminated hydride substituted polysiloxane), methyl hydrogen fluid (methyl terminated hydride methyl substitute polysiloxane, with little to no dimethyl groups) and substituted and modified methyl hydrogens, siloxane backbone materials, siloxane backbone additives, reactive monomers, reaction products of a siloxane backbone additive with a silane modifier or an organic modifier, and other similar types of materials, such as silane based materials, silazane based materials, carbosilane based materials, non-silicon based organic cross linkers, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol (which may be obtained from ALDRICH), Octamethylcyclotetrasiloxane (which may be viewed as a dilutant), and tetramethyltetravinylcyclotetrasiloxane, may be added to the polysilocarb precursor formulation, e.g., to form an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a cured material or structure.

The catalyst can be any platinum (Pt) based catalyst, which can, for example, be diluted to ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 C at a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst. Transition metal catalysis, such as Fe catalysis, Ni catalysis, and Co catalysis, that for example are used in the growth of ordered and highly ordered carbon structures, such as carbon nanotubes, can also be used.

Further, custom and specific combinations of these and other catalysts may be used, such that they are matched to specific formulations, and in this way selectively and specifically catalyze the reaction of specific constituents. Moreover, the use of these types of matched catalyst-formulations systems, as well as, process conditions, may be used to provide predetermined product features, such as for example, pore structures, porosity, densities, density profiles, high purity, ultra high purity, and other morphologies or features of cured structures or materials, and in some instances the ceramics that are formed from the cured structures or materials.

In this mixing type process for making a precursor formulation, preferably chemical reactions or molecular rearrangements only take place during the making of the raw starting materials, the curing process, and in the pyrolizing process. Preferably, in the embodiments of these mixing type of formulations and processes, polymerization, cross-linking or other chemical reactions take place primarily, preferably essentially, and more preferably solely during the curing process.

The precursor may be a methyl terminated hydride substituted polysiloxane, which can be referred to herein as methyl hydrogen (MH), having the formula shown below.

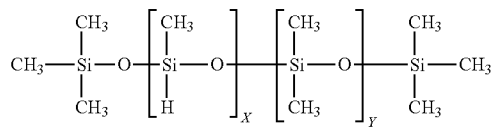

The MH, for example, may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be any of the following linear siloxane backbone materials.

The precursor may be a vinyl substituted polydimethyl siloxane, which formula is shown below.

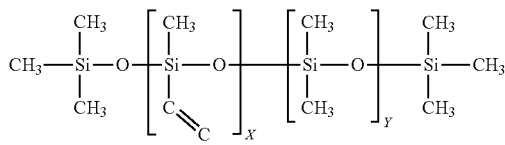

This precursor, for example, may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to increase cross-link density and improve toughness, as well as, other features and characteristics to the cured preform and ceramic material.

The precursor may be a vinyl substituted and vinyl terminated polydimethyl siloxane, which formula is shown below.

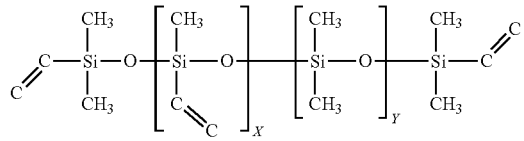

This precursor, for example, may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a vinyl substituted and hydrogen terminated polydimethyl siloxane, which formula is shown below.

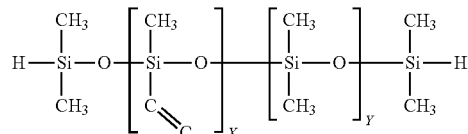

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be an allyl terminated polydimethyl siloxane, which formula is shown below.

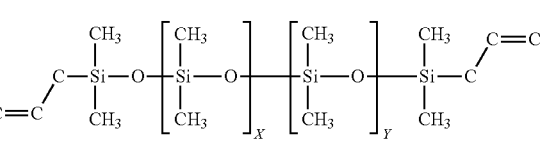

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a vinyl terminated polydimethyl siloxane (VT), which formula is shown below.

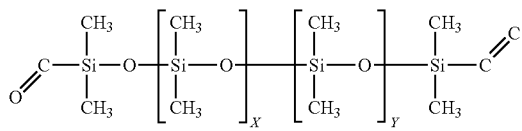

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a silanol (hydroxy) terminated polydimethyl siloxane, which formula is shown below.

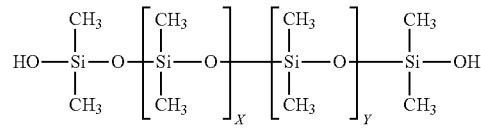

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a silanol (hydroxy) terminated vinyl substituted dimethyl siloxane, which formula is shown below.

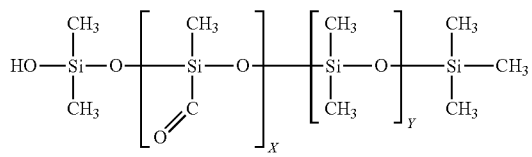

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a hydrogen (hydride) terminated polydimethyl siloxane, which formula is shown below.

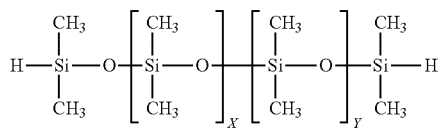

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

The precursor may be a di-phenyl terminated siloxane (which may also be referred to as phenyl terminated), which formula is shown below.

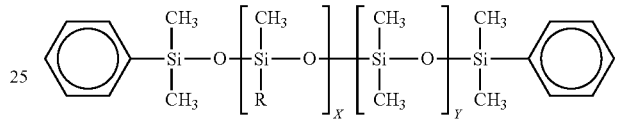

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a mono-phenyl terminated siloxane (which may also be referred to as trimethyl terminated, phenyl terminated siloxane), which formulas are shown below.

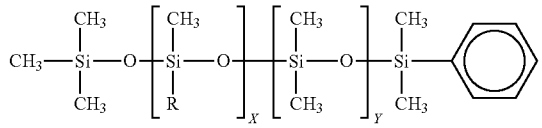

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a diphenyl dimethyl polysiloxane, which formula is shown below.

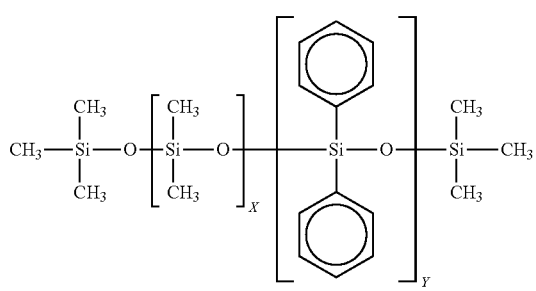

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a vinyl terminated diphenyl dimethyl polysiloxane, which formula is shown below.

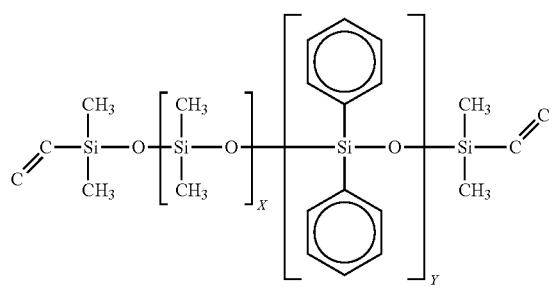

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a hydroxy terminated diphenyl dimethyl polysiloxane, which formula is shown below.

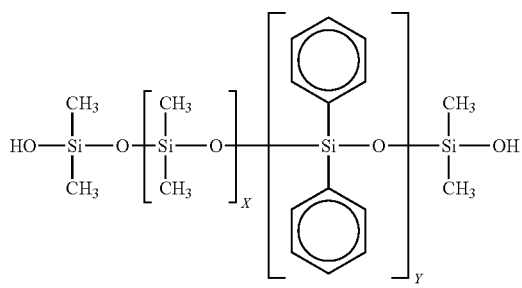

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

This precursor may be a methyl terminated phenylethyl polysiloxane, (which may also be referred to as styrene vinyl benzene dimethyl polysiloxane), which formula is shown below.

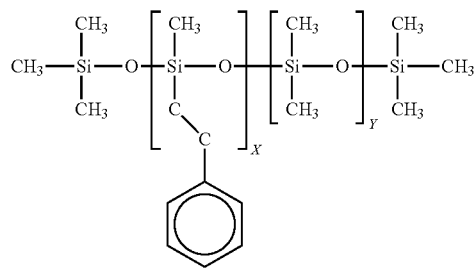

This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

The forgoing linear siloxane backbone materials, are by way of example, and it is understood that other similar linear siloxane backbone materials can also be used as precursors. More complex linear and branched siloxane backbone materials may be used as precursors, but are not preferred.

A variety of cyclosiloxanes can be used as precursors, and are reactive molecules, in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is $>=1$, and x+y is from 3-8. Further, in this nomenclature system-D represents —$SiO_2$ groups, typically $Me_2SiO_2$, Q represents $SiO_4$, T represents —$SiO_3$ groups, typically $MeSiO_3$ and M represent —SiO groups, typically $Me_3SiO$.

The precursor batch may also: (i) contain non-silicon based precursors, such as non-silicon based cross-linking agents; (ii) be the reaction product of a non-silicon based cross linking agent and a silicon based precursor; and, (iii) combinations and variation of these. The non-silicon based cross-linking agents are intended to, and provide, the capability to cross-link during curing. For example, non-silicon based cross-linking agents include: cyclopentadiene (CP), methylcyclopentadiene (MeCP), dicyclopentadiene (DCPD), methyldicyclopentadiene (MeDCPD), tricyclopentadiene (TCPD), piperylene, divnylbenzene, isoprene, norbornadiene, vinylnorbornene, propenylnorbornene, isopropenylnorbornene, methylvinylnorbornene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, or other Si bond in a precursor, can be used as a cross-linking agent. Some organic materials containing oxygen, nitrogen, and sulphur may also function as cross-linking agents.

The amount of the non-silicon based cross-linking agent to the silicon based precursor can be from about 10% to 90% non-silicon based cross-linker to 10% to 90% silicon based precursor (preferably a silicon backbone, e.g., —Si—O— backbone, material). Thus, the ranges of amounts can be, for example: DCPD/MHF from 10/90 to 90/10, about 40/60 to 60/40, about 50/50, and combinations and variations of these ratios, as well as other ratios. A third and fourth precursor material may also be used. Thus, the ratio of non-silicon cross linker/silicon backbone precursor/third precursor, can be: form about 10% to about 80% non-silicon based cross linker; from about 10% to 80% silicon based precursor: and form about 0.1% to 40% third precursor. The ranges and amounts can be, for example: DCPD/MHF/$3^{rd}$ precursor from about 10/20/70 to 70/20/10, from about 10/20/70 to 10/70/20, from about 45/55/10 to about 55/45/10, from about 40/55/5 to about 55/40/5 and combinations and variations of these ratios as well as other ratios.

The precursor may be a reactive monomer. These would include molecules, such as tetramethyltetravinylcyclotetrasiloxane (TV), which formula is shown below.

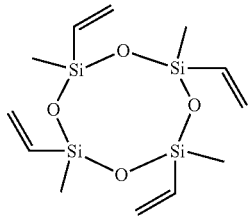 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

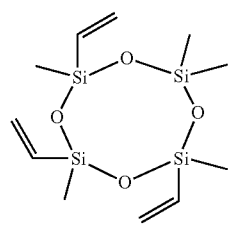 [SMILES: C=C[Si]1(C)O[Si](C)(C)O[Si](C)(C=C)O[Si](C)(C=C)O1]

divinyl cyclotetrasiloxane,

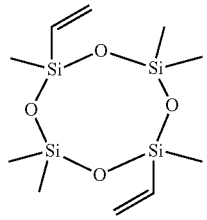

trivinyl monohydride cyclotetrasiloxane,

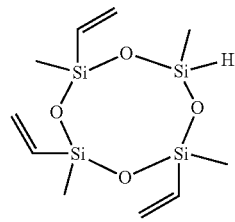 [SMILES: C=C[Si]1(C)O[SiH](C)O[Si](C)(C=C)O[Si](C)(C=C)O1]

divinyl dihydride cyclotetrasiloxane,

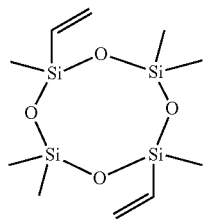

and a hexamethyl cyclotetrasiloxane, such as,

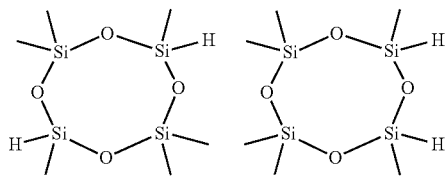

The precursor may be a silane modifier, such as vinyl phenyl methylsilane, diphenylsilane, diphenylmethylsilane, and phenylmethylsilane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenylmethylsilane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances. The precursor may be a partially hydrolyzed tertraethyl orthosilicate, such as TES 40 or Silbond 40. The precursor may also be a methylsesquisiloxane such as SR-350 available from Momentive (previously from General Electric Company, Wilton, Conn.). The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

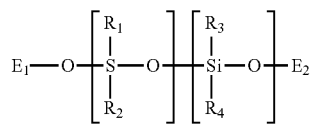

Wherein end cappers $E_1$ and $E_2$ are chosen from groups such as trimethylsiliy (trimethyl silicon) (—Si(CH$_3$)$_3$), dimethylsilyl hydroxy (dimethyl silicon hydroxy) (—Si(CH$_3$)$_2$OH), dimethylhydridosilyl (dimethyl silicon hydride) (—Si(CH$_3$)$_2$H), dimethylvinylsilyl (dimethyl vinyl silicon) (—Si(CH$_3$)$_2$(CH=CH$_2$)), dimethylphenylsily (—Si(CH$_3$)$_2$(C$_6$H$_5$)) and dimethylalkoxysilyl (dimethyl alkoxy silicon) (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(—C), ethyl (—C—C), vinyl (—C=C), alkyl (—R)(C$_n$H$_{2n+1}$), allyl (—C—C=C), aryl ('R), phenyl (Ph) (—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$).

In general, embodiments of formulations for polysilocarb formulations may, for example, have from about 0% to 50% MHF, about 20% to about 99% MHF, about 0% to about 30% siloxane backbone material, about 20% to about 99% siloxane backbone materials, about 0% to about 70% reactive monomers, about 0% to about 95% TV, about 0% to about 70% non-silicon based cross linker, and, about 0% to about 90% reaction products of a siloxane backbone additives with a silane modifier or an organic modifier reaction product.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation. This precursor formulation is then cured into a preform, i.e., plastic, cured solid or semi-solid material, through a hydrolysis reaction. The condensation reaction forms a polymer of the type shown below.

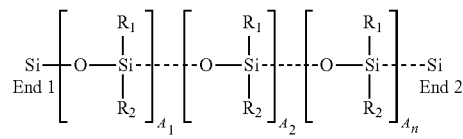

Where $R_1$ and $R_2$ in the polymeric units can be a hydride (—H), a methyl (Me)(—C), an ethyl (—C—C), a vinyl (—C=C), an alkyl (—R)(C$_n$H$_{2n+1}$), an unsaturated alkyl (—C$_n$H$_{2n-1}$), a cyclic alkyl (—C$_n$H$_{2n-1}$), an allyl (—C—

C=C), a butenyl (—$C_4H_7$), a pentenyl (—$O_5H_9$), a cyclopentenyl (—$O_5H_7$), a methyl cyclopentenyl (—$O_5H_6(CH_3)$), a norbornenyl (—$C_xH_y$, where X=7-15 and Y=9-18), an aryl ('R), a phenyl (Ph)(—$C_6H_5$), a cycloheptenyl (—$C_7H_{11}$), a cyclooctenyl (—$C_8H_{13}$), an ethoxy (—O—C—C), a siloxy (—O—Si—$R_3$), a methoxy (—O—C), an alkoxy, (—O—R), a hydroxy, (—O—H), a phenylethyl (—C—C—$C_6H_5$) a methyl,phenyl-ethyl (—C—C(—C)(—$C_6H_5$)) and a vinyl-phenyl-ethyl (—C—C($C_6H_4$(—C=C))). $R_1$ and $R_2$ may be the same or different. The custom precursor polymers can have several different polymeric units, e.g., $A_1$, $A_2$, $A_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane. an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silane of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene (DCPD). Using the reactive blending process a MHF/DCPD polymer is created and this polymer is used as a precursor formulation. It can be used alone to form a cured or pyrolized product, or as a precursor in the mixing or reaction processes.

Thus, for example, from about 40 to 90% MHF of known molecular weight and hydride equivalent mass; about 0.20 wt % P01 catalyst; and from about 10 to 60% DCPD with ≥83% purity, can be used.

P01 is a 2% Pt(0) tetravinylcyclotetrasiloxane complex in tetravinylcyclotetrasiloxane, diluted 20× with tetravinylcyclotetrasiloxane to 0.1% of Pt(0) complex. In this manner 10 ppm Pt is provided for every 1% loading of bulk cat.

In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% (by weight of the MHF) of P01 Platinum catalyst is added to the MHF in the reaction vessel. Typically, upon addition of the catalyst, bubbles will form and temperature will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temperature stays above 80° C. for a minimum total of about 2 hours and a maximum total of about 4 hours. After 2-4 hours above 80° C., the heater is turn off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table A sets forth various embodiments of precursor materials.

color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, i.e., all of the reaction has stopped, or the leveling off of the decrease in reactive groups over time, i.e., essentially all of the reaction has stopped). Thus, the material may be cured to varying degrees, depending upon its intended use and purpose. For example, in some situations the end cure and the hard cure may be the same. Curing conditions such as atmosphere and temperature may effect the composition of the cured material.

In multi-layer, or composite structures and shapes, a layer of the polysilocarb material may be cured to varying degrees, for example in a multi-layer embodiment, the layers can be green cured to promote layer adhesion, then finally cured to a hard cure. Each layer in a multi-layer structure can be cured to the same degree of cure, to different degrees of cure, subject to one, two, three or more curing steps, and combinations and variations of these.

TABLE A

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclotetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.87 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to from the polymer. "Equivalents_/mol" refers to the molar equivalents. "Grams/mole of vinyl" refers to the amount of a given polymer needed to provide 1 molar equivalent of vinyl functionality. "VMH" refers to methyl vinyl fluid, a linear vinyl material from the ethoxy process, which can be a substitute for TV. The numbers "0200" etc. for VT are the viscosity (e.g., 0200=200 cps) in centipoise for that particular VT.

Curing and Pyrolysis

Precursor formulations, including the polysilocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$ (e.g., an amount of $O_2$ lower than atmospheric, such as less than 20% $O_2$, less than 15% $O_2$, less than 10% $O_2$ less than 5% $O_2$), reduced pressure (e.g., less than atmospheric), elevated pressure (e.g., greater than atmospheric), enriched $O_2$, (e.g., an amount of $O_2$ greater than atmospheric), ambient pressure, controlled partial pressure and combinations and variations of these and other processing conditions.

In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the cured material, the ceramic and the final applications or products.

For high purity materials, the furnace, containers, handling equipment, atmosphere, and other components of the curing apparatus and process are clean, essentially free from, and do not contribute any elements or materials, that would be considered impurities or contaminants, to the cured material.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to about 90° C. Although higher and lower temperatures and various heating profiles, (e.g., rate of temperature change over time ("ramp rate", e.g., Δ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, by way of example, an —$R_1$—Si—C—C—Si—O—Si—C—C—Si—$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicon atoms. Although additional other structures and types of cured materials are contemplated. Thus, for example, use of Luperox 231 could yield a structure, from the same monomers, that was —Si—C—C—C—Si—. When other cross linking agents are used, e.g, DCPD and divinyl benzene, the number of carbons atoms between the silicon atoms will be greater than 5 atoms. A generalized formula for some embodiments of the cross-linked, e.g., cured, material, would be —Si—$R_3$—Si—, where $R_3$ would be ethyl (from for example a vinyl precursor), propyl (from for example a allyl precursor), dicyclopentane (from for example a DCPD precursor), norbornane (from for example a norbornadiene precursor), diethylbenzene (from for example a divinyl benzene precursor), and others.

During the curing process, some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing may be accomplished by any type of heating apparatus, or mechanisms, techniques, or morphologies that has the requisite level of temperature and environmental control. Curing may be accomplished through, for example, heated water baths, electric furnaces, microwaves, gas furnaces, furnaces, forced heated air, towers, spray drying, falling film reactors, fluidized bed reactors, indirect heating elements, direct heating (e.g., heated surfaces, drums, and plates), infrared heating, UV irradiation (light), an RF furnace, in-situ during emulsification via high shear mixing, in-situ during emulsification via ultrasonication, broad spectrum white light, IR light, coherent electromagnetic radiation (e.g. lasers, including visible, UV and IR), and convection heating, to name a few.

In an embodiment, curing may also occur under ambient conditions for an embodiment having a sufficient amount of catalyst.

If pyrolysis is conducted for an embodiment the cured material can be for example heated to about 600° C. to about 2,300° C.; from about 650° C. to about 1,200° C., from about 800° C. to about 1300° C., from about 900° C. to about 1,200° C. and from about 950° C. to 1,150° C. At these temperatures typically all organic structures are either removed or combined with the inorganic constituents to form a ceramic. Typically, at temperatures in the about 650° C. to 1,200° C. range the resulting material is an amorphous glassy ceramic. When heated above about 1,200° C. the material typically may from nano crystalline structures, or micro crystalline structures, such as SiC, $Si_3N_4$, SiCN, β SiC, and above 1,900° C. an SiC structure may form, and at and above 2,200° C. α SiC is typically formed. The pyrolized, e.g., ceramic materials can be single crystal, polycrystalline, amorphous, and combinations, variations and subgroups of these and other types of morphologies.

The pyrolysis may be conducted under may different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low $O_2$, gas rich (e.g., within or directly adjacent to a flame), inert, $N_2$, Argon, air, reduced pressure, ambient pressure, elevated pressure, flowing gas (e.g., sweep gas, having a flow rate for example of from about from about 15.0 GHSV (gas hourly space velocity) to about 0.1 GHSV, from about 6.3 GHSV to about 3.1 GHSV, and at about 3.9 GHSV), static gas, and combinations and variations of these.

In some embodiments, upon pyrolization, graphenic, graphitic, amorphous carbon structures and combinations and variations of these are present in the Si—O—C ceramic. A distribution of silicon species, consisting of SiOxCy structures, which result in $SiO_4$, $SiO_3C$, $SiO_2C_2$, $SiOC_3$, and $SiC_4$ are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon The pyrolysis may be conducted in any heating apparatus, that maintains the request temperature and environmental controls. Thus, for example pyrolysis may be done with, pressure furnaces, box furnaces, tube furnaces, crystal-growth furnaces, graphite box furnaces, arc melt furnaces, induction furnaces, kilns, $MoSi_2$ heating element furnaces, carbon furnaces, vacuum furnaces, gas fired furnaces, electric furnaces, direct heating, indirect heating, fluidized beds, RF furnaces, kilns, tunnel kilns, box kilns, shuttle kilns, coking type apparatus, lasers, microwaves, other electromagnetic radiation, and combinations and variations of these and other heating apparatus and systems that can obtain the request temperatures for pyrolysis.

In embodiments of the polysilocarb derived ceramic materials has any of the amounts of Si, O, C for the total amount of material that are set forth in the Table B.

TABLE B

|  | Si | | O | | C | |
| --- | --- | --- | --- | --- | --- | --- |
|  | Lo | Hi | Lo | Hi | Lo | Hi |
| Wt % | 35.00% | 50.00% | 10.00% | 35.00% | 5.00% | 30.00% |
| Mole Ratio | 1.000 | 1.429 | 0.502 | 1.755 | 0.334 | 2.004 |
| Mole % | 15.358% | 63.095% | 8.821% | 56.819% | 6.339% | 57.170% |

In general, embodiments of the pyrolized ceramic polysilocarb materials can have about 20% to about 65% Si, can have about 5% to about 50% O, and can have about 3% to about 55% carbon weight percent. Greater and lesser amounts are also contemplated.

In general, embodiment of the pyrolized ceramic polysilocarb materials can have a mole ratio (based on total Si, O, and C) of about 0.5 to about 2.5 for Si, can have a mole ratio of about 0.2 to about 2.5 for O, and can have a mole ration of about 0.1 to about 4.5 for C. Greater and lesser amounts are also contemplated.

In general, embodiment of the pyrolized ceramic polysilocarb materials can have a mole % (percentage of total Si, O, and C) of about 13% to about 68% for Si, can have a mole % of about 6% to about 60% for O, and can have a mole % of about 4% to about 75% for C. Greater and lesser amounts are also contemplated.

The type of carbon present in embodiments of the polysilocarb derived ceramic pigments can be free carbon, (e.g., turbostratic, amorphous, graphenic, graphitic forms of carbon) and carbon that is bound to silicon. Embodiments of ceramic polysilocarb materials having free carbon and silicon-bound-carbon (Si—C) are set forth in Table C. Greater and lesser amounts and different percentages of free carbon and silicon-bound-carbon are also contemplated.

TABLE C

| Embodiment | % Free Carbon | % Si—C type |
| --- | --- | --- |
| 1 | 64.86 | 35.14 |
| 2 | 63.16 | 36.85 |
| 3 | 67.02 | 32.98 |
| 4 | 58.59 | 41.41 |
| 5 | 68.34 | 31.66 |
| 6 | 69.18 | 30.82 |
| 7 | 65.66 | 34.44 |
| 8 | 72.74 | 27.26 |
| 9 | 72.46 | 27.54 |
| 10 | 78.56 | 21.44 |

Generally, embodiments of polysilocarb derived ceramic materials can have from about 30% free carbon to about 70% free carbon, from about 20% free carbon to about 80% free carbon, and from about 10% free carbon to about 90% free carbon, and from about 30% Si—C bonded carbon to about 70% Si—C bonded carbon, from about 20% Si—C bonded carbon to about 80% Si—C bonded carbon, and from about 10% Si—C bonded carbon to about 90% Si—C bonded carbon. Greater and lesser amounts are also contemplated.

Metals and Metal Complexes

By way of example, metals and metal complexes that can be used as fill material would include Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); and Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alkyl complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the silicon precursor compounds and then treated with hydroxide to form the oxides at the same time as the polymer, copolymerizes. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, and about 20 mole percent or greater. The forgoing use of metals with the present precursor formulas can be used to control and provide predetermined stoichiometries.

HEADINGS AND EMBODIMENTS

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of formulations, compositions, articles, plastics, ceramics, materials, parts, uses, applications, equipment, methods, activities, and operations set forth in this specification may be used for various other fields and for various other activities, uses and embodiments. Additionally, these embodiments, for example, may be used with: existing systems, articles, compositions, plastics, ceramics, operations or activities; may be used with systems, articles, compositions, plastics, ceramics, operations or activities that may be developed in the future; and with such systems, articles, compositions, plastics, ceramics, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A thin ceramic effects pigment flake, the flake comprising an amorphous ceramic polysilocarb; wherein the flake defines a thickness and a surface, wherein the surface defines a longest dimension, and wherein the longest dimension is less than 500 μm.

2. The flake of claim 1, whereby upon exposure to sunlight the flake exhibits an optical effect selected from the group consisting of reflectance, refraction, opalescence, shine, twinkle and sparkle.

3. The flake of claim 1, whereby upon exposure to sunlight exhibits an optical effect selected from the group consisting of interference, amplification and cancellation.

4. A plurality of ceramic effect pigment thin flakes, comprising a polysilocarb based ceramic, the flakes having an average thickness of about 1.0-1.3 microns; and 80% or more of the flakes having a particle size distribution of from about 1700-150 μm and 20% or less of the flakes having a particle size distribution of <150 μm.

5. The flakes of claim 4, whereby upon exposure to sunlight exhibit an optical effect selected from the group consisting of sparkle, metallic, pearlescence, shine, shimmer, interference, amplification and cancellation.

6. The flakes of claim 4, wherein the ceramic polysilocarb is amorphous.

7. The flakes of claim 4, comprising a metal oxide coating over the ceramic polysilocarb.

8. The flakes of claim 5, wherein the ceramic polysilocarb is amorphous.

9. The flakes of claim 5, comprising a metal oxide coating over the ceramic polysilocarb.

10. The flake of claim 1, wherein the flake is planar.

11. The flakes of claim 4, wherein the flakes are planar.

12. The flakes of claim 4, wherein the flakes are corn flake shaped.

13. A plurality of ceramic effect pigment thin flakes, comprising a polysilocarb based ceramic, the flakes having an average thickness of about 0.8-1.0 μm, and a particle size distribution of about D10 6.00 μm, D50 11.0-14.50 μm, and D90 21.00-25.00 μm; and a sieve residue 45 μm less than 2.00.

14. The flakes of claim 13, whereby upon exposure to sunlight exhibit an optical effect selected from the group consisting of sparkle, metallic, pearlescence, shine, shimmer, interference, amplification and cancellation.

15. The flakes of claim 13, wherein the ceramic polysilocarb is amorphous.

16. The flakes of claim 13, comprising a metal oxide coating over the ceramic polysilocarb.

17. The flakes of claim 14, wherein the ceramic polysilocarb is amorphous.

18. The flakes of claim 13, comprising a metal oxide coating over the ceramic polysilocarb.

* * * * *